United States Patent
Underwood et al.

(10) Patent No.: US 9,973,417 B2
(45) Date of Patent: May 15, 2018

(54) METHOD AND APPARATUS FOR MANAGING APPLICATION STATE IN A NETWORK INTERFACE CONTROLLER IN A HIGH PERFORMANCE COMPUTING SYSTEM

(71) Applicant: Intel Corporation, Santa Clara, CA (US)

(72) Inventors: Keith D. Underwood, Albuquerque, NM (US); Steffen Kosinski, Braunschweig (DE); Jaroslaw Topp, Schoeppenstedt (DE); Jan Norden, Braunschweig (DE); Michael Redeker, Braunschweig (DE)

(73) Assignee: INTEL CORPORATION, Santa Clara, CA (US)

( * ) Notice: Subject to any disclaimer, the term of this patent is extended or adjusted under 35 U.S.C. 154(b) by 76 days.

(21) Appl. No.: 15/256,390

(22) Filed: Sep. 2, 2016

(65) Prior Publication Data

US 2017/0054633 A1 Feb. 23, 2017

Related U.S. Application Data

(63) Continuation of application No. 13/989,038, filed as application No. PCT/US2010/059649 on Dec. 9, 2010, now Pat. No. 9,436,651.

(51) Int. Cl.
*H04L 29/04* (2006.01)
*H04L 12/721* (2013.01)
(Continued)

(52) U.S. Cl.
CPC ............ *H04L 45/38* (2013.01); *G06F 13/385* (2013.01); *G06F 15/167* (2013.01); *H04L 1/12* (2013.01);
(Continued)

(58) Field of Classification Search
CPC ...................................................... H04L 45/38
(Continued)

(56) References Cited

U.S. PATENT DOCUMENTS

| 5,287,552 A | 2/1994 | Sasuta et al. |
| 2005/0138161 A1 | 6/2005 | McDaniel et al. |

(Continued)

OTHER PUBLICATIONS

International Preliminary Report on Patentability for International Application No. PCT/US2010/059649, dated Jun. 12, 2013, 7 pages.
(Continued)

*Primary Examiner* — Adnan Mirza
(74) *Attorney, Agent, or Firm* — Womble Bond Dickinson (US) LLP

(57) ABSTRACT

Methods related to communication between and within nodes in a high performance computing system are presented. Processing time for message exchange between a processing unit and a network controller interface in a node is reduced. Resources required to manage application state in the network interface controller are minimized. In the network interface controller, multiple contexts are multiplexed into one physical Direct Memory Access engine. Virtual to physical address translation in the network interface controller is accelerated by using a plurality of independent caches, with each level of the page table hierarchy cached in an independent cache. A memory management scheme for data structures distributed between the processing unit and the network controller interface is provided. The state required to implement end-to-end reliability is reduced by limiting the transmit sequence number space to the currently in-flight messages.

16 Claims, 15 Drawing Sheets

(51) Int. Cl.
*G06F 15/167* (2006.01)
*G06F 13/38* (2006.01)
*H04L 12/773* (2013.01)
*H04L 1/12* (2006.01)
*H04L 12/26* (2006.01)
*H04L 12/801* (2013.01)
*H04L 29/08* (2006.01)
*H04L 1/18* (2006.01)

(52) U.S. Cl.
CPC .......... *H04L 45/60* (2013.01); *H04L 1/1835* (2013.01); *H04L 43/103* (2013.01); *H04L 47/34* (2013.01); *H04L 67/10* (2013.01); *Y02B 60/1228* (2013.01); *Y02B 60/1235* (2013.01)

(58) Field of Classification Search
USPC ........................................................ 370/392
See application file for complete search history.

(56) References Cited

U.S. PATENT DOCUMENTS

2006/0221875 A1    10/2006   Trainin
2007/0106636 A1     5/2007   Sridharan
2008/0126553 A1     5/2008   Boucher et al.
2008/0288683 A1    11/2008   Ramey

OTHER PUBLICATIONS

International Search Report and Written Opinion of the International Searching Authority for International Application No. PCT/US2010/059649 dated Aug. 8, 2011, 12 pages.

Non-Final Office Action for U.S. Appl. No. 13/989,038 dated Apr. 8, 2015, 10 pages.

Final Office Action for U.S. Appl. No. 13/989,038 dated Oct. 1, 2015, 10 pages.

US 9,973,417 B2

METHOD AND APPARATUS FOR MANAGING APPLICATION STATE IN A NETWORK INTERFACE CONTROLLER IN A HIGH PERFORMANCE COMPUTING SYSTEM

CROSS-REFERENCE TO RELATED APPLICATIONS

This application is a Continuation of U.S. patent application Ser. No. 13/989,038, filed on May 22, 2013, which is a National Stage Entry for PCT Application No. PCT/US2010/059649 filed on Dec. 9, 2010, the entire contents of which are hereby incorporated by reference herein.

FIELD

This disclosure relates to high performance computing and in particular to message passing in a network interface controller.

BACKGROUND

A high performance computing (HPC) system may include thousands of nodes, with each node including a multiprocessing unit and a network interface unit (NIC) for communication over a communications network. Multiple nodes in the HPC system may work in parallel on a computing task for a software application. The nodes in the HPC system execute application threads involved in the computing task and co-ordinate the execution of computing threads for the computing task by exchanging messages over the communications network.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Processing of messages may be performed by the Network Interface Controller (NIC) instead of by the processing unit (multi-core processor) in a node. However, when the processing of messages is performed by the NIC, the movement of information associated with message processing between the NIC and the processing unit in the node will increase the time to perform message processing tasks for the application if the NIC does not maintain a local copy of the necessary information. Thus, the processing of messages by the NIC requires the addition of resources to the NIC to manage application state in the NIC. The additional resources result in an increase in die size when the NIC is implemented in an integrated circuit (IC).

In an embodiment of the present invention, communication time for information exchange between the processing unit and the NIC is reduced. In addition, die size is decreased by minimizing the resources required to manage application state in the NIC.

Figure 1:
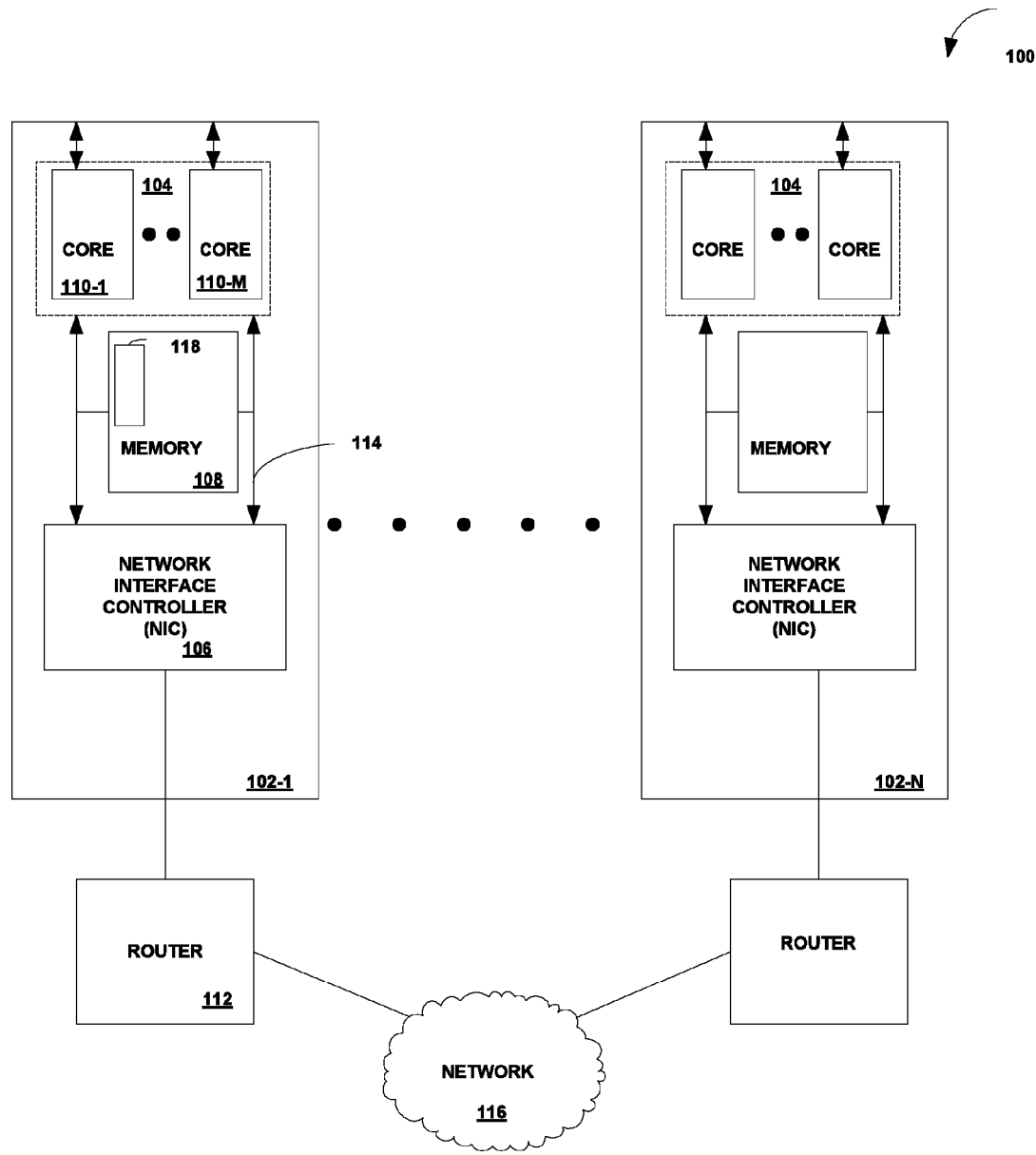
FIG. 1 is a block diagram of an embodiment of a high performance computing (HPC) system.

FIG. 1 is a block diagram of an embodiment of a high performance computing (HPC) system 100. The HPC system 100 includes a plurality of nodes 102-1,102-N, with each node including a multiprocessing unit 104, a network interface controller (NIC) 106 and memory 108. The multiprocessing unit 104 includes a plurality of core processors 110-1, ..., 110-M. The nodes 102-1, ..., 102-N communicate over a network 116 via at least one network router 112. In an embodiment, the core processors 110-1, ..., 110-M communicate with the NIC 106 via system host bus interface 114. In an embodiment, the system host bus interface 114 is a Peripheral Communications Interface (PCI) Express interface that uses the PCI Express (PCIe) protocol. In other embodiments, the system bus interface 114 may use other system bus interfaces, for example, QuickPath Interconnect (QPI) or HyperTransport (HT).

The multiprocessing unit 104 may be any one of a plurality of multi-core processors such as Intel® Pentium D, Intel® Xeon® processor, or any other multi-core processor.

The memory 108 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

A software application 118 that may be stored in memory 108 may be executed in parallel on at least two nodes 102 with the nodes 102 communicating using messages transmitted over the network 116. In an embodiment, the message passing may be performed using the Message Passing Interface (MPI). MPI is a standard library specification for message-passing that is designed for high performance on both massively parallel computer systems and workstation clusters.

Figure 2:
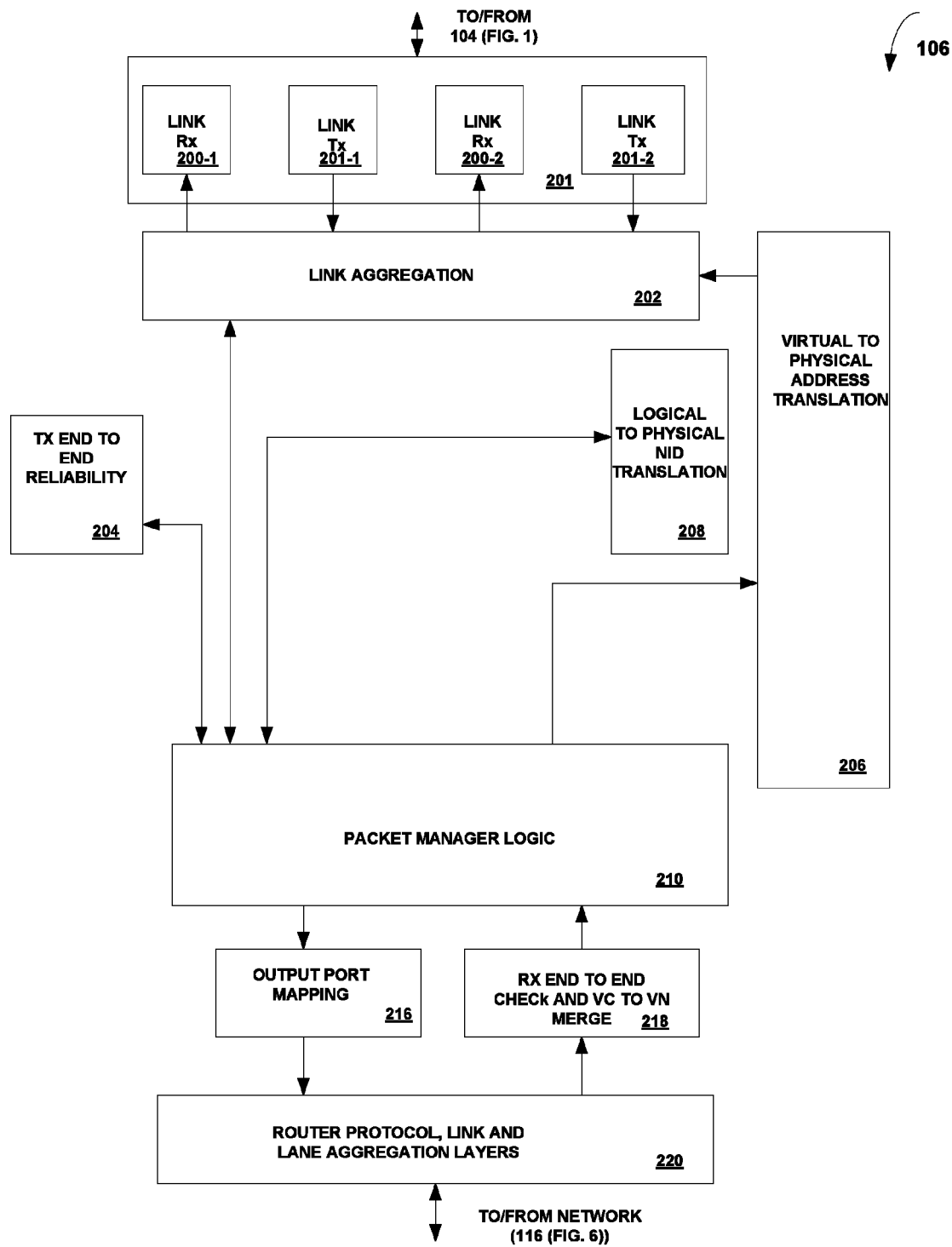
FIG. 2 is a block diagram of an embodiment of any one of the network interface controllers shown in FIG. 1.

FIG. 2 is a block diagram of an embodiment of any one of the network interface controllers 106 shown in FIG. 1. The network interface controller 106 includes a system bus interface 201 which includes a plurality of receive and transmit links. In the embodiment shown in FIG. 2, the system interface 201 includes two Rx links 200-1, 200-2 and two Tx links 201-1, 201-2. The number of Rx links and Tx links are not limited to two. In an embodiment, the system bus interface 201 is a PCIe interface. FIG. 2 will be described for an embodiment in which the system bus interface 201 is a PCIe interface. There are two modes to handle the forwarding of a system bus packet received from the multi-processing unit 104 by the system bus interface 201 in the NIC 106 to the router 112. One mode uses Programmed Input/Output (PIO) and the other mode uses Direct Memory Access (DMA).

In PIO mode, any one of the plurality of core processors 110-1, ..., 110-M can push a packet over any one of the plurality of Rx PCIe links 200-1, 200-2 to the NIC 106. The received PCIe packet includes a command and data to be transmitted in a network packet via the network 116. The packet is forwarded through PCIe Aggregation logic 202 to the packet manager logic 210. The packet manager logic 210 reformats the command after issuing a request to logical to physical Network IDentifier (NID) translation logic 208 to perform translation of the NID included in the command and obtains a retransmit handle and sequence number from the Transmit End to End Reliability logic 204. The reformatted command and physical NID are transmitted in a network packet that is forwarded through output port mapping logic 216 and router protocol, link and lane aggregation layers 220 to the network 116.

In DMA mode, any one of the plurality of core processors 110-1, ..., 110-M can push a command over any one of the plurality of the Rx PCIe links 202-1, 102-2 to the NIC 106. The packet is forwarded through the PCIe Aggregation logic 202 to the packet manager logic 210. In contrast to PIO mode, only the command is pushed to the NIC 106, data to be transmitted in the network packet to the network is transferred to the NIC 106 later using DMA.

The packet manager logic 210 issues a request to logical to physical Network Identifier (NID) logic 208 to perform translation of the NID. The packet manager logic 210 issues requests to memory 108 through virtual to physical address translation logic to download data to be transmitted in packets over the network 116

The reformatted command, physical NID, virtual network (VN) and data are transmitted in a network packet that is forwarded through the output port mapping logic 216 and the router protocol, link and lane aggregation layers 220 to the network 116.

A network packet that is received from the network 116 is forwarded through the router protocol, link and lane aggregation layers 220 and the Receive (Rx) End-to-End (E2E) and Virtual Channel (VC) to Virtual Network (VN) merge logic 218 to the packet manager logic 210.

The packet manager logic 210 determines whether to accept or reject the received network packet. If the packet manager logic 210 accepts the received network packet, the received network packet is forwarded through the virtual to physical address translation logic 206, the PCIe aggregation logic 202 and one of the pluralities of PCIe Transmit links 201-1, 201-2 to the multi-core processor 104.

Figure 3:
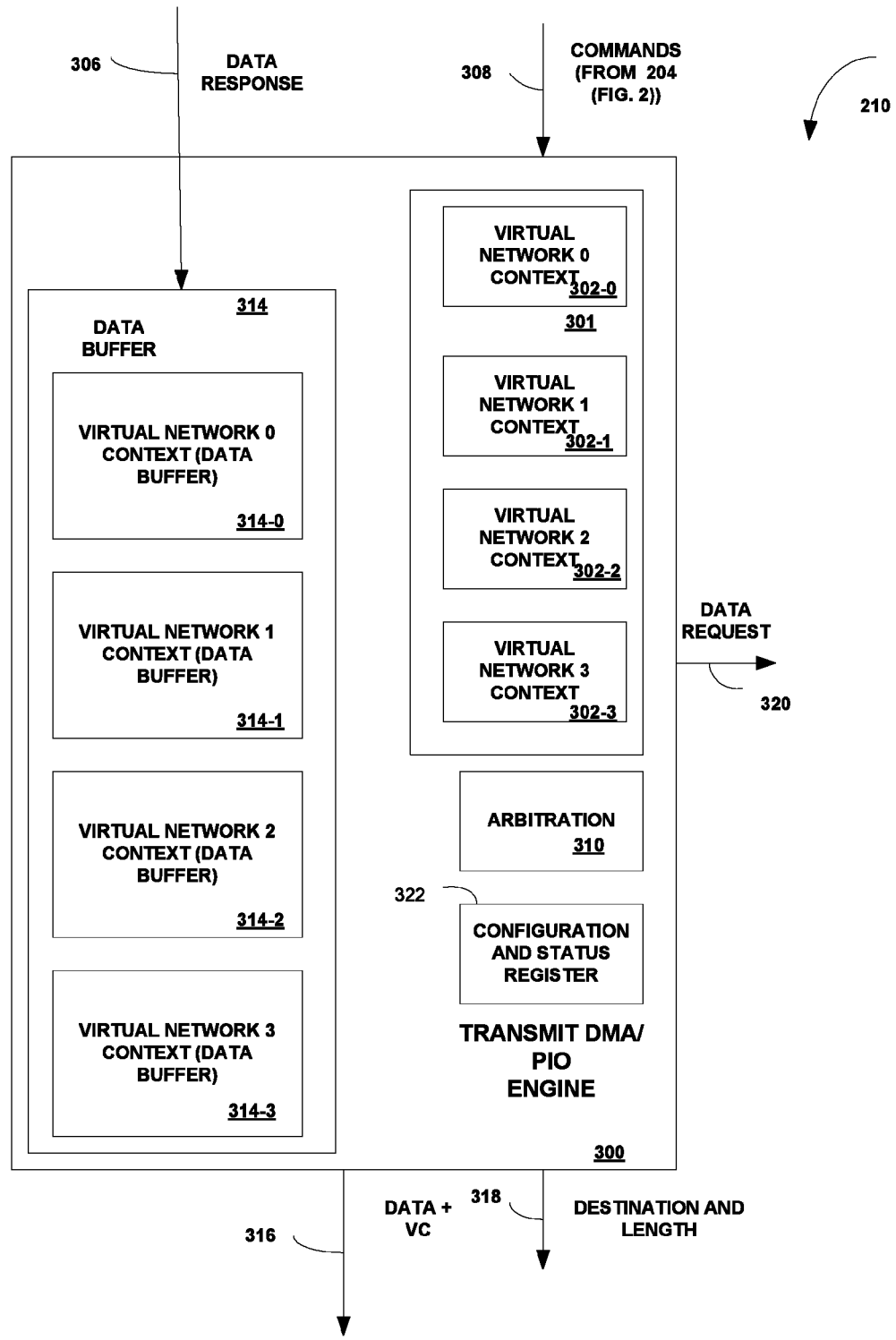
FIG. 3 is a block diagram of an embodiment of a transmit DMA/PIO engine in the packet manager logic shown in FIG. 2.

FIG. 3 is a block diagram of an embodiment of a transmit DMA/PIO engine 300 in the packet manager logic 210 shown in FIG. 2. The transmit DMA/PIO engine 300 includes a data buffer 314, memory to store context state 301 and an arbiter 310.

In a HPC system, complex higher level protocols such as a rendezvous protocol for long message transmission, use a large number of message classes. For example, in an embodiment, the number of message classes can range from three to five. Large messages can be placed in any of these message classes. Thus, typically a separate and independent DMA engine is provided to handle messages for each message class.

A message class may also be referred to as a virtual network. In a system having multiple message classes (virtual networks), this creates redundant data paths through the NIC 106 that are not fully utilized. It also requires that the multiple data paths be multiplexed down to one path from the NIC 106 to the router 112. In addition, as the plurality of DMA engines operate independently from each other, an arbitration scheme does not inherently optimize throughput. Thus, memory 108 in the node 102 that is reserved for storing messages cannot be managed dynamically on a per-message-class basis.

In a system having a plurality of DMA engines, arbitration between DMA engines is typically at the packet level on the transmit path from the DMA engines to the router 112. On the receive path from the DMA engines to the host interface in the NIC, arbitration between the DMA engines is typically at a small granularity (64 to 256 bytes).

In the traditional approach to arbitration, each independent DMA engine does not have knowledge of the state of other DMA engines. Thus, an arbiter tries to provide fair arbitration among the DMA engines. However, fair arbitration does not inherently optimize throughput. For example, in a network using wormhole flow-control, fair arbitration typically results in underutilization of the physical channels in the NIC 106. Wormhole flow-control is a system of flow control in a network that is based on known fixed links. Large network packets are split into flow control digits (flits) with the first flit for the packet storing route information (for example, destination address). The first flit is followed by zero or more body flits that store the payload of the network packet. The last flit for the network packet closes the network connection.

In an embodiment of the present invention, instead of having multiple independent DMA engines and independent data paths, multiple contexts are stored in a single DMA engine. In an embodiment, a context includes state and a data buffer. The single DMA engine 300 has only one physical path through the NIC 106 and one instance of control logic to handle all of the contexts. In an embodiment in which the NIC 106 is included in an integrated circuit, the single DMA engine 300 reduces the die area and power required by the integrated circuit.

The single DMA engine 300 also simplifies arbitration timing on the NIC's host interface 114 (that is, the interface to the multiprocessor unit 104 which may also be referred to as a system interface) because the single DMA engine 300 is cognizant of the state of all of the contexts. This knowledge of all of the contexts also enables better arbitration for the router interface that is, the interface between the NIC 106 and the router 112.

In an embodiment, a single transmit DMA engine 300 is used to transmit packets to the network (transmit DMA engine) and a separate receive DMA engine is used to receive packets from the network 112. Each respective DMA engine 300 has one context per message class (also referred to as a virtual network). Each context is allocated a portion of the data buffer 314 to store context data and a portion of context state memory 301 to store context state. Arbitration for access to the host (multiprocessor unit 104 (FIG. 1)) by the NIC 106 is optimized to improve network throughput in a wormhole routed network. In addition, arbitration for access to the router 112 by the NIC 106 is optimized to improve network throughput in the wormhole routed network.

Multiple contexts are multiplexed onto one physical DMA engine 300, allowing one wide data path. In one embodiment, the wide data path is 32 bytes. One context is dedicated to each message class (Virtual Network (VN)). Each DMA context includes the state associated with a message descriptor and a data buffer. In an embodiment, the data buffer 314 is implemented as one logical memory, with one input path and one output path, to reduce the data paths through the NIC. The data buffer 314 is managed on a per-message-class basis that is, on a per context basis.

Referring to FIG. 3, a DMA (/PIO) engine 300 includes a data buffer 314 and arbitration logic 310. The DMA engine 300 also includes a plurality of virtual network contexts, with each virtual network context including a respective virtual network context state 302-0, . . . , 302-3 and virtual network context data buffer 314-0, . . . 314-3. In the example shown, only four virtual network contexts are shown. However, the number of virtual network contexts is not limited to four. Each respective virtual network context data buffer 314-0, . . . 314-3 is an allocated portion of the data buffer 314 that is allocated to the virtual network (message class). However, dynamic allocation of the data buffer 314 to a virtual network (message class) is also possible in alternative embodiments.

In the embodiment shown in FIG. 3, the DMA engine 300 is a transmit DMA engine that receives a data response 306 and commands 308 from the host interface and based on the virtual network context transmits Data and Virtual Channel (VC) 316 and destination and length 318 to the network interface, where each virtual network may be mapped to a plurality of virtual channels (VCs). The transmit DMA engine 300 receives a command 308 via the system bus interface 104 that describes a new message to be transmitted over the network 116. After receiving the command 308 to transmit, the transmit DMA engine 300 makes a request for data 320 to the host memory system 108. The host responds with data 306, which the transmit DMA engine 300 formats into a message for the network. The message for the network includes two parts, which are separated in the embodiment shown in FIG. 3 to facilitate flow control. The first part is a destination for the message and the length of the message (318), which is passed to the next NIC block within the packet manager logic 210 using standard techniques for communicating between blocks. Based on this information, the second part of the message for the network, that is, the actual data in the message and the virtual network (and virtual channel within that virtual network) that data will be placed on 316 is provided by the transmit DMA engine 300.

The Transmit DMA engine 300 shown in FIG. 3 must be able to sink responses to all read requests that it makes. Thus, the portion of the data buffer 314 assigned to a respective Virtual Network context data buffer is larger than the round-trip bandwidth delay product of the host interface. The unification of all of the DMA contexts into a single DMA engine allows the data buffer 314 to either be managed statically or dynamically. If managed statically, each context data buffer is allocated memory equal to the round-trip bandwidth delay. If managed dynamically, only a small amount of memory is dedicated to each message class (virtual network) and the remaining memory can be allocated from a common pool (in the data buffer 314).

The transmit DMA engine 300 examines the state of all of the contexts. Starting from an idle state, a message is selected to gain access to the single DMA channel. The Transmit DMA engine 300 processes the message until it is blocked, for example, if the local buffer in the Transmit DMA engine is full. If the message blocks before it is completed, a second message, if available, is started in another context. However, the "oldest" message retains priority. Also, a new context will only be allocated when all outstanding messages are either blocked or all outstanding contexts are complete.

This is generalized to the case where N messages are blocked and the N+1st message is started up to the maximum number of DMA contexts. As the network bandwidth matches the host interface bandwidth, the host bandwidth is allocated to each context to maximize network throughput. Allowing a message to become "idle" in a wormhole routed network binds a virtual channel even though that virtual channel does not currently have data to transfer. This introduces artificial contention in the network.

Thus, it is not desirable to stop servicing a message flowing freely through the network simply because a single flow-control unit (flit) becomes available in the buffer for an older message. While it is desirable to prioritize that older message, it is possible that the older message is being serviced very slowly by the network and that switching back to the older message may allow the current message to go idle. In an embodiment of the present invention, a method is provided for selecting when to switch between servicing different contexts.

A low water mark is stored in a configuration register (commonly called a CSR for configuration and status register) 322. The low water mark is a key configuration parameter for arbitration policy that is added to the DMA buffer for each message class to indicate a lower threshold for the fill level of the oldest and, therefore, highest priority message buffer to indicate that the oldest and, therefore, highest priority message needs to be serviced. The DMA engine 300 does not stop servicing the current context until 1) the message completes, 2) the outgoing channel blocks due to lack of credits, that is, the data buffer allocated to the current context is full, or 3) an older message reaches its low water mark. The oldest message that is below its low water mark receives priority. This type of "low water mark" scheme can be used to emulate arbitration schemes when there is available buffer space. For example, if the low water mark for an active context is zero, the active context is continuously serviced until it is blocked. In another example, if the low water mark is set to 1 flit below full, the oldest context that has any buffer space free is chosen to be serviced.

In the arbitration for access to the router interface of the NIC 106, each new message binds a virtual channel through some portion of the network until it completes. A pure round robin or other fair arbitration scheme trickles data into each virtual channel in a way that extends the time that a virtual channel is bound. Thus, the router interface prioritizes the oldest message in flight that has credits available in the network 116. In addition, the DMA buffer (data buffer) 314 has a "high water" mark stored in the configuration and status register 322 that can be programmed to delay the injection of a head of the message into the network 116 until a portion of the buffer has been filled. Messages smaller than the threshold are not injected onto the network 116 until the entire message is available. This "high water" threshold does not apply to any data beyond the first "threshold" bytes of the message.

In an embodiment, the DMA engine 300 shown in FIG. 3 is a Receive DMA engine. Programmable thresholds are also added to the Receive DMA engine to allow the Receive DMA Engine to schedule requests. In one embodiment, the receive DMA engine delays the first request from the NIC to the host interface until a first data threshold is reached or the entire message has been received. This enables the configuration of "bursty" communications down a given channel, rather than having all channels slowly trickle in simultaneously.

A second data threshold allows the receive DMA engine to prioritize messages that are preventing network service, that is, messages whose incoming DMA buffers 314 are "full". The next receive DMA context to be scheduled is the oldest context above this threshold. If no context is above this threshold, the oldest context is scheduled.

High performance computing (HPC) is dependent on high bandwidth, high message rate, and low latency communications. One technique to provide high bandwidth, high message rate, low latency communications is to allow a software application program to issue commands directly to the NIC 106. However, commands sent directly from a software application program executing in the host system (multi-core processor 104, host memory 108) to the NIC 106 via the system (host) bus 114 include a virtual address which requires virtual to physical address translation to be performed in the NIC 106.

Returning to FIG. 2, in an embodiment, the NIC 106 includes virtual to physical address translation logic 206 to translate a virtual address received from the processor over the system bus 114. For example, in an embodiment in which the system bus (host bus) 114 is PCI Express, the virtual address is received via one of the plurality of PCI Express (PCIe) links 201-1, 201-2.

Typically, a Translation Lookaside Buffer (TLB)-like structure in conjunction with a Memory Management Unit (MMU) in the NIC 106 or host memory is registered and the translation is cached. Usage patterns vary significantly, and include some patterns that randomly access all or most of host memory. These random access patterns are known to perform poorly on traditional Translation Lookaside Buffer (TLB) types of structures.

Random accesses to host memory are problematic for registration based interfaces, because operating systems, for example, Linux do not behave well when all of the host memory is registered. The addition of an MMU to the NIC offers some improvements; however, when a TLB structure is used, random access patterns can result in every network message resulting in a TLB miss. These misses then lead to a traversal of the entire page table, which can involve many round trip transfers over the system bus (host bus) before a full translation can be retrieved.

Page tables are typically used to translate a virtual memory to physical memory address. For example, in an x86 virtual to physical translator, the 9 Most Significant Bits (MSB) of a 48-bit virtual address referred to as the root of the page table is a per process resource that points to a 512 entry table. The 9 MSBs of the virtual address are used to index into this page table to an entry that stores a pointer to the base of a page directory pointer table. The next 9 MSBs of the virtual address are used to index into the page directory pointer table. The indexed entry in the page directory pointer stores either a pointer to the base of a page directory, or the base of a page, in the case of 1 Giga Byte (GB) page translation. In 2 Mega Byte (MB) page mode, the page directory entry provides the physical base address. In 4 Kilo Byte (KB) page mode, there is one more level of the hierarchy. The page directory entry provides the base address of the page table, which is indexed to find a page table entry that provides the physical base address.

In an embodiment of the present invention, the virtual to physical address translation on the NIC is accelerated by using a plurality of independent caches, with each level of the page table hierarchy cached in an independent cache. As the upper levels of the page table hierarchy require relatively little state, the time associated with walking a page table by the NIC is reduced. In addition, the amount of memory needed to store all of the page tables for all of the processes using the NIC 106 is reduced by providing a cache of the active portions of the page table in the NIC 106.

Figure 4:
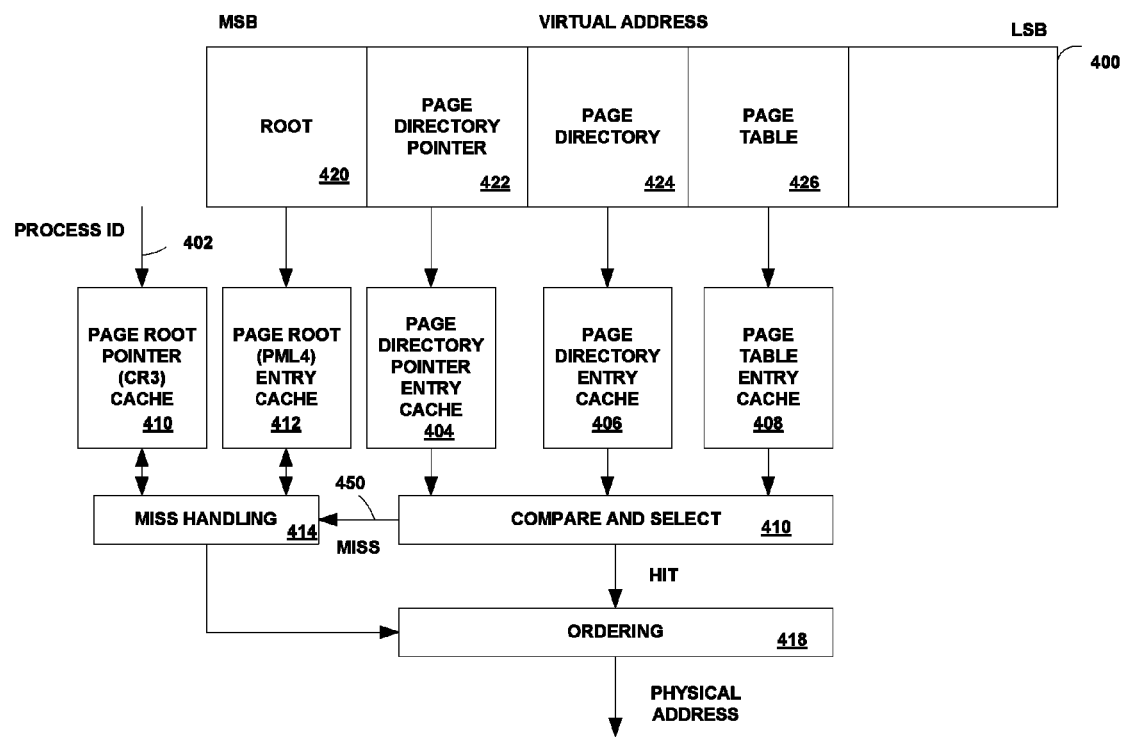
FIG. 4 is a block diagram of an embodiment of the virtual to physical translation logic shown in FIG. 2.

FIG. 4 is a block diagram of an embodiment of the virtual to physical translation logic 206 shown in FIG. 2. A request that includes a virtual address 400 and a Process Identifier (PID) 402 is received by the virtual to physical translation logic 206. The respective portions of the virtual address 400 are forwarded concurrently to a plurality of independent caches. In the embodiment shown in FIG. 4, the plurality of independent caches include a page directory pointer entry cache 404, a page directory entry cache 406, and a page table entry cache 408. The portions (a set of bits) of the virtual address 400 include a root 420 which includes the Most Significant Bits (MSB) of the virtual address, a page directory pointer 422, a page directory 424 and a page table 426. The page table structure shown in FIG. 4 is an example of one page table structure that can be used, other page table structures can be used.

The page directory pointer entry cache 404, page directory entry cache 406, and page table entry cache 408 provide a function that is equivalent to the function provided by a Translation Lookaside Buffer (TLB). A result indicating whether there is a hit or miss in the respective independent cache is output by each respective cache 404, 406, 408 and forwarded to compare and select logic 416. In the embodiment shown, three page sizes are supported in the caches, that is, 1 GB, 2 MB, and 4 KB.

The compare and select logic 416 determines from the results received from the page directory pointer entry cache 404, the page directory entry cache 406, and the page table entry cache 408, if there is a hit in all of the caches. If there is a hit, there is an address translation stored in the caches for the virtual address 400 and the address translation is forwarded to ordering logic 418. If not, the lowest level of the memory hierarchy that is cached in the caches, for example, a page directory entry in the page table entry cache 408 is forwarded to miss handling logic 414 with a miss request 450.

The miss handling logic 414 is the "slow path". The miss handling logic 414 takes the lowest level of the page table that is cached for the virtual address 400 and walks the remainder of the page table. To do this, the miss handling logic 414 caches the Page Map Level 4 (PML4) pointer, that is, the page table root pointer that is typically stored in control register 3 (CR3), the base address of the page-table hierarchy.) based on the Process Identifier (PID) that the request is associated with. Similarly, the miss handling logic 414 caches the PML4 entry 412.

As shown in the embodiment in FIG. 4, all levels of the page table hierarchy are cached in independent caches 404, 406, 408, 410, and 412. The caching is performed in a reasonable amount of state and, in the typical miss case, results in only one lookup across the system bus (host interface bus) 114 to retrieve a page table entry.

For each process using the NIC 106, the NIC 106 caches active (non-zero) parts of the top two levels of the page tables, that is, the page root entries 410 and the page directory table entries 412. The NIC 106 can also cache the pointer to the root of the page table (CR3) 410, indexed by process identifier (PID).

In an embodiment of the present invention each level of the page table hierarchy is cached independently, for example, Page Memory Level 4 (PML4), Page Directory Pointer (PDP), Page Directory Entry (PDE), Page Table Entry (PTE). Instead of having a TLB-like structure for translations, higher levels of the page table hierarchy are also cached, that is, CR3 and the page directory. As the higher levels of the page table hierarchy seldom change, a small number of cache entries can maintain all of the relevant state. When there is a miss in the lowest level translation, that is, the structure that resembles a TLB, instead of having the Memory Management Unit (MMU) on the NIC walk the entire page table from host memory, the MMU can perform a lookup into the cache on the NIC corresponding to the higher level entries. Thus, instead of performing four system bus accesses to the host memory to get the next translation, the MMU may only need to perform one system bus access to host memory.

By separating the multiple levels into independent caches, each level can be optimized in various ways. For example, the bits used as a "tag" in each cache can be optimized and the size of each cache can be optimized to almost always have the upper levels of the page table cached on the NIC 106. Also, as the levels above the Page Table Entry (PTE) are relatively small, these caches can be small while still caching all of the data needed to minimize the number of round trips required over the system bus 114 to retrieve the translation state.

While parallelism can be used to increase the aggregate message rate into a node, delivering high message rates to a single Message Passing Interface (MPI) process requires a significant amount of pipelined processing. When the processing of messages is pipelined, it introduces a challenge for the management of flow-control. Flow-control frequently is invoked in response to various types of resource exhaustion. However, this resource exhaustion does not occur until late in the pipeline. Thus, by the time the resource exhaustion occurs, it is no longer possible to invoke standard flow control schemes, because other network state has been modified. The standard approach to flow-control is to reject messages early in the pipeline before the network state has been altered and to reject subsequent messages to maintain ordering. For some types of flow-control events, this early rejection is straightforward; however, when the resource exhaustion occurs late in a processing pipeline, it is possible for messages to pass the flow-control stage before the resource exhaustion is detected.

In the context of MPI, there is often a finite resource for delivery notifications, for example, event posting/message completion from the networking layer (lowest level network Application Programming Interface (API)) to the MPI layer (middleware layer that the software application interfaces with). A rapid succession of arriving messages can readily exhaust this resource. However, the exhaustion of the resource is not detected until the message has been "matched" and the networking state altered. An embodiment of the present invention provides a mechanism to provide network flow-control in a pipelined processing engine. An embodiment will be described for Portals. Portals is a low-level network Application Programming Interface (API) for high performance networking on HPC systems which may be referred to as the "networking layer". Portals 4 supports flow control which disables an incoming channel when a flow-control event triggers. Portals 4 flow control is similar to the receiver-not-ready scheme in InfiniBand, a switched fabric communications link used in high performance HPC systems.

Portals provides a scalable flow-control mechanism that allows for pipelining of operations on the NIC. A Portal table entry (PTE) in the host system can be set up to enable flow control. If flow control is enabled, an exhaustion of local resources will trigger a flow control event. Resources that can be exhausted include event queue entries, unexpected header space and unexpected message space An event queue facilitates the interaction of the host side and NIC side resources. The event queue is used to communicate information about the completion of a message from the network layer to the application.

Figure 5:
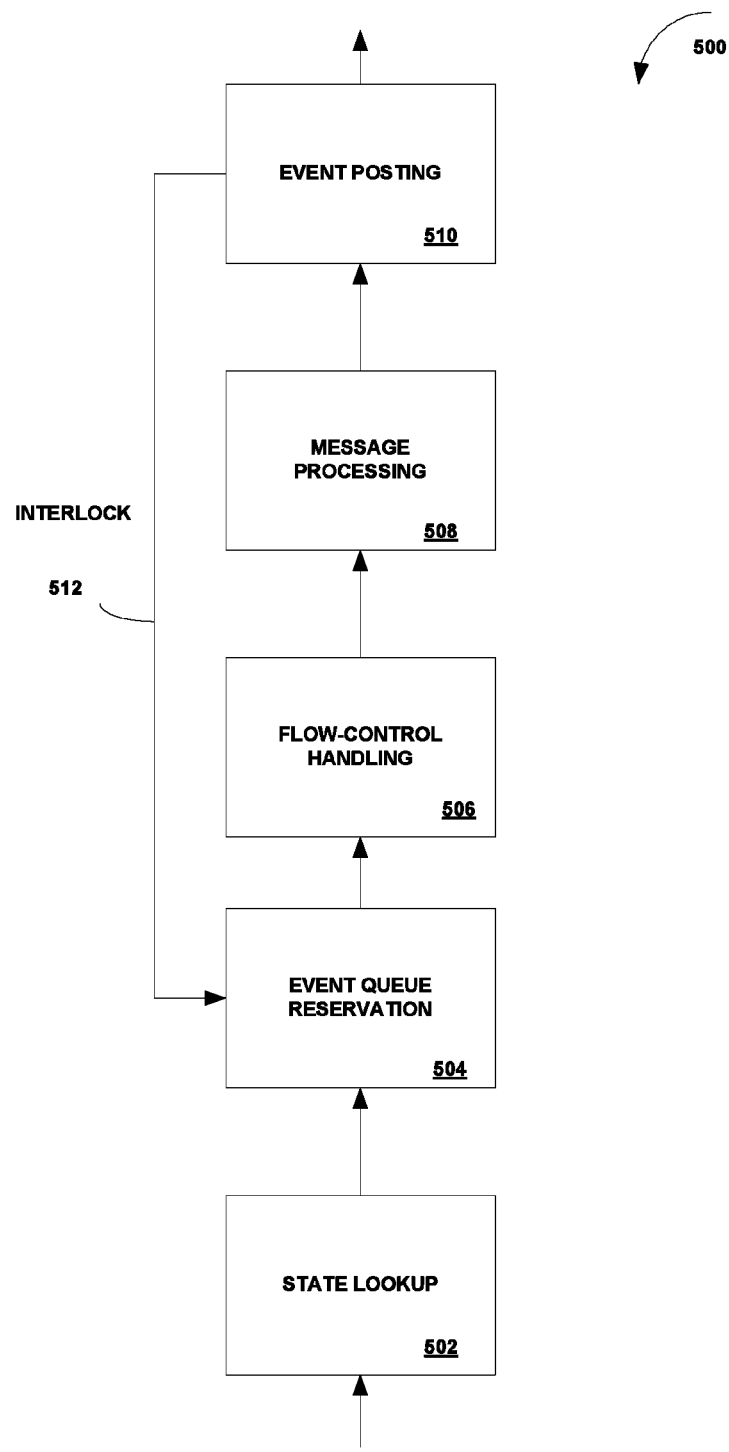
FIG. 5 is a block diagram of a message processing pipeline in the packet manager logic shown in FIG. 2.

FIG. 5 is a block diagram of a message processing pipeline 500 in the packet manger logic 210 shown in FIG. 2. The message processing pipeline 500 includes an embodiment of an event queue (EQ) reservation unit 504 and an interlock 512 according to the principles of the present invention. The message processing pipeline 500 also includes a state lookup unit 502, a flow-control handling unit 506, a message processing unit 508 and an event posting unit 510. The state lookup unit 502 is used to lookup relevant state for a message header in a received message. The message processing unit 508 processes the message header, for example, to do matching. The event posting unit 510 posts the event.

Each respective unit in the message processing pipeline 500 can involve multiple pipeline stages. For example, the overall pipeline length can be about 100 cycles, with a pipeline throughput of about one message every 10 cycles. In this example, there can be 10 messages in flight between the state lookup and the event posting. Furthermore, there can be several messages in flight between the flow control handling unit 506 and the event posting unit 510.

When a message header is processed, network state is modified. The message processing unit 508 is the point at which significant network state is changed in the message and the point at which it is determined whether the message will post an event. A resource required to process the message can become exhausted at the event posting unit (pipeline stage) 510 at the back of the pipeline 500. The processing of the next message in the pipeline 500 is dependent on detecting this modified state. To maintain a high message throughput, the path is pipelined such that invoking flow control, processing messages, and posting events are in separate pipeline stages. However, waiting until after the event posting stage 510 to begin processing the next message substantially reduces throughput of the pipeline 500.

There is an event queue which can be stored in host memory 108 in application space where notifications of message completion are placed. It is filled by the NIC 106 and drained by the application. When this event queue is full, that is, the event queue resource is exhausted, the event queue overflows and causes a loss of messages. Thus, the NIC 106 cannot determine whether an event will be delivered for a given message until after message processing has occurred in the event posting stage 510.

An embodiment of the present invention provides a coarse grained predictor (the event queue reservation unit 504) that is added at the front of the processing pipeline to indicate if resource exhaustion is possible. A coarse-grained tracking capability allows the front end of the pipeline 500 to predict when a flow-control issue might arise in the pipeline 500. In addition, an interlock 512 is added between the event queue reservation unit 504 at the front end of the pipeline 500 and the event posting unit 510 at the back end of the pipeline 500. The predictor and the interlock allow the pipeline 500 to continue processing in the typical case and only invoke the interlock 512 when the system is operating near resource exhaustion. The interlock 500 between the resource exhaustion point at the back of the pipeline 500 and the predictor at the front end of the pipeline 500 slows down processing as exhaustion is approached. In addition, the interlock 512 between the resource exhaustion point and the front of the pipeline invokes a flow-control mechanism to handle messages in the pipeline 500 when a message would cause resource exhaustion.

Figure 6:
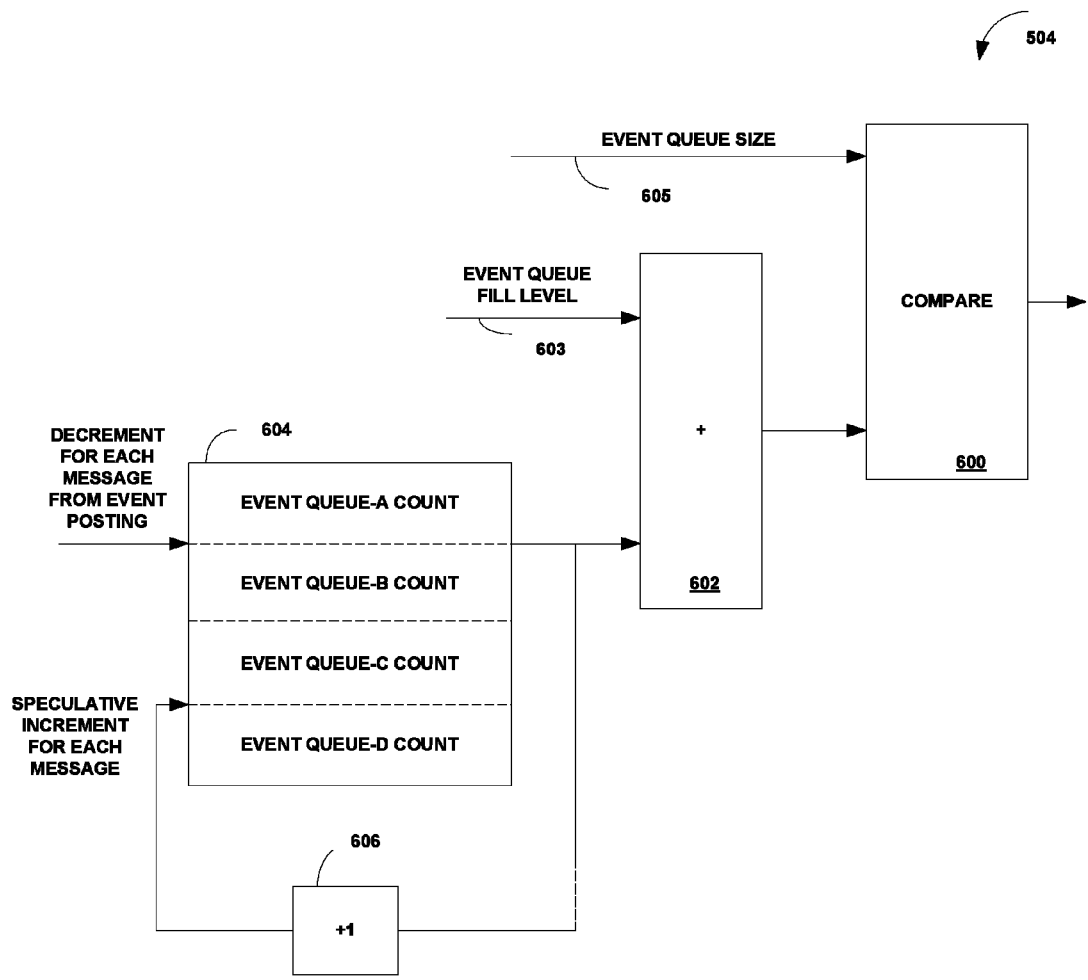
FIG. 6 is a block diagram illustrating an embodiment of the event queue reservation unit shown in the message processing pipeline shown in FIG. 5.

FIG. 6 is a block diagram illustrating an embodiment of the event queue reservation unit 504 shown in FIG. 5.

Referring to FIG. 6, the event queue reservation unit 504 in the pipeline 500 includes a count table 604 to store a count of the number of messages in flight on a per event queue basis between the reservation unit 504 and the event posting unit 510 in the pipeline 500. As discussed, the event posting unit 510 at the back end of the pipeline 500 updates the event queue.

In the embodiment shown there are four event queues each having a separate count stored in the count table 604 labeled count EQ-A, through EQ-D. As the number of messages in flight through the pipeline 500 is small, the maximum size of the count table 604 to track the count of messages in flight per event queue can be small. As long as the respective event queue fill level 603 plus the number of messages in flight that is stored in the respective count register 604 output from accumulator 602 is smaller than the size of the event queue 605 output from comparator 600, the message is allowed to proceed. If a message may cause an overflow in the event queue, the pipeline stages ahead of the message are drained.

In an embodiment, a process identifier (PID) and event queue handle (index variables) can be hashed to index into a much smaller table of entries to track the in-flight messages. In this embodiment, there is no caching or eviction policy. Instead, when the pipeline stalls due to an event queue potentially being full, a higher portion of the messages are drained to allow advancing. This has the advantage of further reducing the width of the path from the event posting unit (stage) 510 to the event queue reservation unit (stage) 504, but it does introduce some aliasing into the prediction. As the number of in-flight messages through the NIC 106 is small, this aliasing is unlikely to have an impact unless the particular event queues involved are very close to overflow.

Not all messages post events, but false positives, that is, an overflow is predicted, but does not occur, are acceptable for the event queue reservation unit 504. When an overflow is predicted, the pipeline 500 stalls and invokes the interlock 512 with the event posting unit 512. This slows down the message processing in the pipeline 500 and does not pass the false positive to the flow control handling unit 506, which prevents flow control from being invoked prematurely. A false positive occurs when the NIC 106 is operating "near" an overflow condition. Thus, it is advantageous to slow down processing in this case to give the host processor an opportunity to catch up. False negatives, that is, an overflow occurs when none was predicted are not acceptable, as this leads to a loss of network state.

Referring to FIG. 5, the feedback path (interlock 512) from the event posting unit 510 to the event queue reservation unit 504 allows the count of messages in flight stored in the count register 604 to be decremented. The decrement of the count associated with the event queue is performed after the event queue fill level 603 has been updated based on any events the message may require to be posted as not all messages post events. When the count for the respective event queue associated with this message reaches zero, the event queue fill level 604 is re-read. If the event queue is not full, the message can proceed. Otherwise, a flow control algorithm is invoked and the message is dropped.

Figure 7:
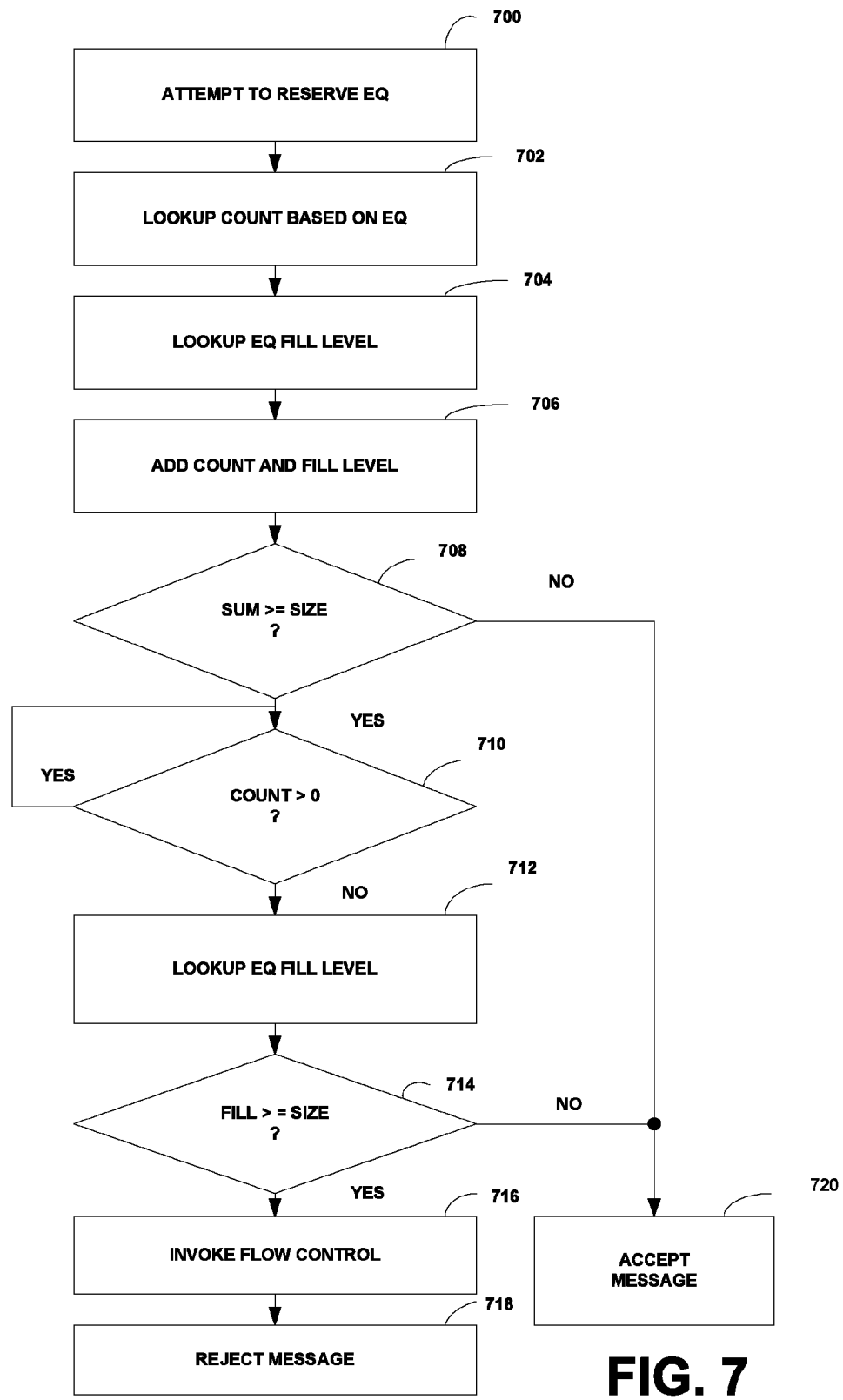
FIG. 7 is a flowgraph illustrating an embodiment of a method implemented in the pipeline shown in FIG. 5.

FIG. 7 is a flow graph illustrating an embodiment of a method implemented in the pipeline 500 shown in FIG. 5.

At block 700, the event queue reservation unit 504 begins an attempt to reserve an event queue. Processing continues with block 702.

At block 702, the event queue reservation unit 504 checks the number of operations that are in flight (count) that could impact the same event queue as this message. Processing continues with block 704.

At block 704, the event queue reservation unit 504 checks the current number of entries that are consumed in the event queue that this message will target when it completes. Processing continues with block 706.

At block 706, the count and the current fill level are added together in the event queue reservation unit 504. Processing continues with block 708.

At block 708, if the sum of the number of operations that are in flight and the current fill level is less than the total size of the event queue, processing continues with block 720. If not, processing continues with block 710.

At block 710, if the sum is greater than or equal to the total size of the event queue, the event queue reservation unit 504 checks to see if the count is greater than zero. If the count is greater than zero, the event queue reservation unit 504 stalls the current message. The event posting unit 510 sends updates to the event queue reservation unit 504 when other operations to the event queue being tested are complete. These updates decrement the count. When the count is no longer greater than zero, processing continues with block 712.

At block 712, when all relevant in-flight operations have completed, the event queue reservation block 504 checks the event queue fill level again. Processing continues with block 714.

At block 714, the size of the event queue is checked again to see if it is full in the message processing unit 504. If full, processing continues with block 716 or the pipeline may be stalled by returning to block 712 to check the event queue fill level. In an embodiment, it is possible to continue to stall the pipeline 500 for a brief period of time before invoking the flow control algorithm (at block 716); however, blocking indefinitely may introduce a new type of protocol dependent deadlock at the application level in a manner that is not allowed by the upper level programming APIs, for example, MPI and Portals. If the event queue is not full, processing continues with block 720.

At block 716, the event queue is full, flow control is invoked in the flow control handling unit 506. Processing continues with block 718.

At block 718, the message is dropped in the flow control handling unit 506.

At block 720, the EQ reservation block (504) allows the transaction to proceed and the message is processed in the event queue 508.

In a embodiment, it is possible to continue to stall the pipeline 500 for a brief period of time before invoking the flow control algorithm; however, blocking indefinitely may introduce a new type of protocol dependent deadlock at the application level in a manner that is not allowed by the upper level programming APIs, for example, MPI and Portals.

When higher level protocol processing is offloaded to the network interface controller (NIC) 106, there are many data structures (resources) that are accessed by the NIC 106. In many cases, these data structures are located in the NIC 106 which has constrained resources. There are many options for dealing with these resource constraints including exposing the resource constraints to the application as limits, adding additional state to the NIC 106 or permitting spill-over of state to the host. Exposing resource constraints can be a significant limitation for software application developers. Adding additional state can add unnecessary system cost. Permitting spill-over of state involves managing state between the NIC 106 and the host.

In an embodiment of the present invention, a memory management scheme for data structures that is distributed between a host and network interface is provided. The allocation and freeing of resources (allocation, freeing) is managed by both the NIC and the host. In addition, a strategy for addressing that is homogeneous between the host and the NIC is provided.

Figure 8:
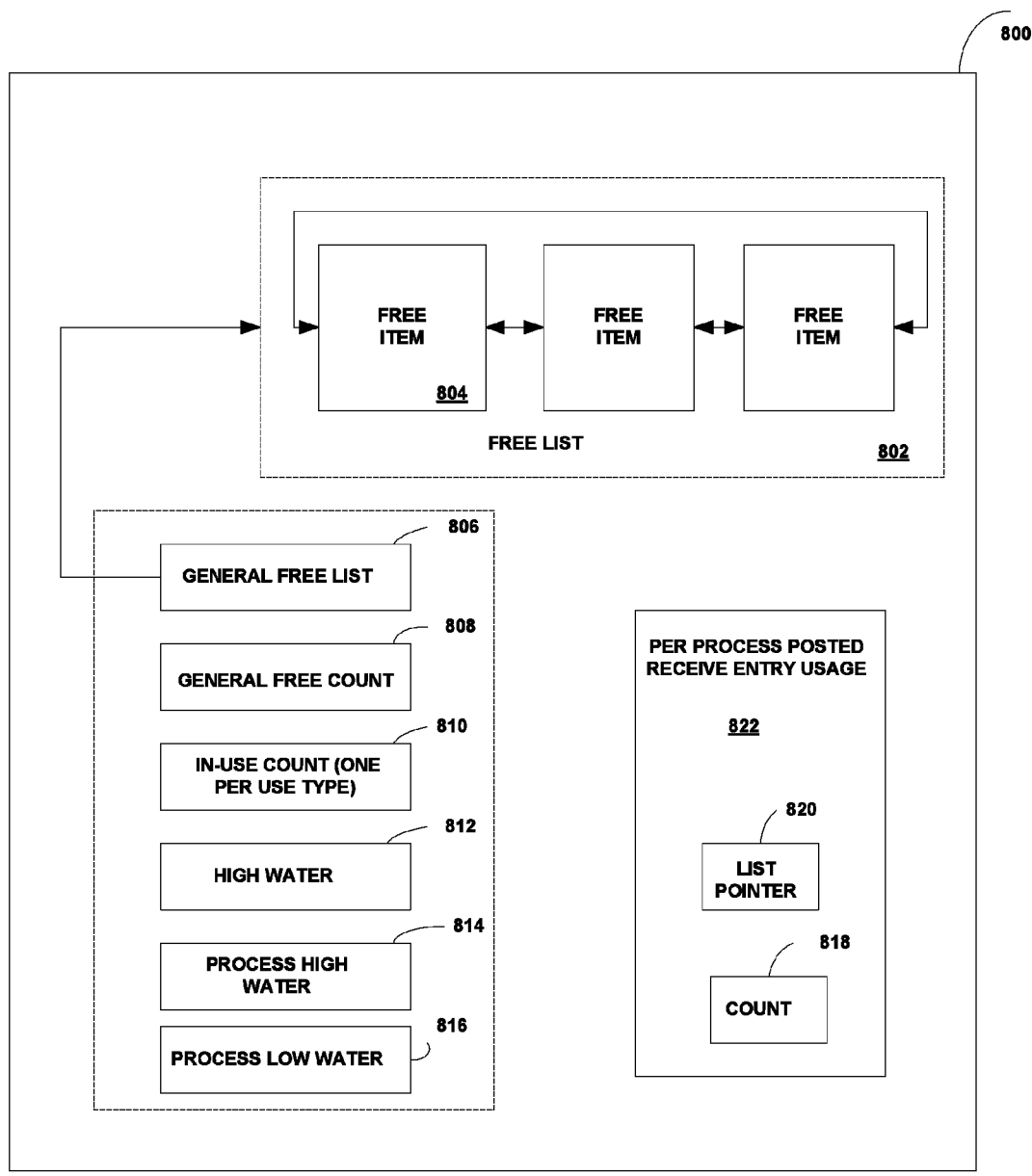
FIG. 8 is a block diagram of list processing logic included in the packet manager logic shown in FIG. 2.

FIG. 8 is a block diagram of list processing logic 800 included in the packet manager logic 210 shown in FIG. 2.

The packet manager logic 210 (FIG. 2) includes memory (not shown) to store a global pool of resources (local state) that is shared by all processes for different types of state. The global pool of resources includes list root entries (LEs), rendezvous entries, match list entries (MEs), and unexpected header entries. A match list entry (ME) is a descriptor of a memory region that is associated with full Portals addressing information and access control information. A List Entry (LE) is a descriptor of a memory region that has limited Portals addressing, but does include full access control information.

The node 102 (FIG. 1) also has two non-NIC ("host") pools of memory per process in the application's address space. Match list entries (MEs) and list root entries (LEs) are allocated by the host, and are freed by the NIC. Unexpected header entries whether at the host or NIC 106 are managed by the NIC 106 and the rendezvous entries are managed by the NIC 106. The NIC 106 passes state back to the host using a special set of commands and events.

Typically, the NIC 106 has a local pool of resources that is shared by all processes accessing the NIC 106. These resources are shared for several types of state, including management of a posted receive queue and unexpected message list. In an embodiment, a per-process spill-over region is provided on the host for use by the NIC 106.

In an embodiment for offload, posted receive queue entries are allocated by the host, and freed by the NIC 106. In addition, the NIC 106 manages the queue entries by performing the allocation of receive queue entries for the host. In contrast, unexpected message entries irrespective as to whether they are located in the host or the NIC 106 are managed by the NIC 106.

The NIC 106 assists the host with management of NIC state because the management of the NIC state is dynamic. In contrast, host state can be used as needed by the process because it is dedicated to the process.

The state associated with managing the distribution of NIC state is shown in FIG. 8. There is a free list 802 of all of the free items 804 in the NIC 106. A free item is an available (unallocated) portion of memory in the NIC's memory buffer. The free item is used when the host requests additional items and the NIC allocates them to the specific host process.

For each use of the items 804 on the free list 802, there is an in-use count 810 and a high water threshold 812. In addition, there is a counter entry 818 per process to track how many NIC side Match list Entries (MEs) the process currently has allocated to it, a list pointer 820 to a list of items allocated to a process, but not used and a "per process high water mark". A process that has more NIC side resources than the high water mark will not be allocated more NIC side resources. The list of items is needed to reclaim NIC state from processes that exit without freeing their resources.

When an item 804 in the free list 802 is allocated in the NIC's state, that item is taken from the free list 802 and moved to an appropriate "in use" list. The general free count 808 indicates how many items are in the general free list 806. The general free count 808 is used to determine whether a user's request for resources can be satisfied. The in-use count 810 for each use type is incremented when an item is allocated to that use type. If the "in use" count 810 for a type of usage reaches the high water mark for that use type, no more NIC side items 804 can be allocated to that use type. If a Match List Entry (ME) is allocated to a process, that process's count 818 is incremented and the ME is added to the use list of that process. A process that requests additional MEs is not granted MEs if the free list 802 is empty, the ME/list root entry (LE) count has reached the maximum allocation, or the process has reached its maximum allocation of NIC based MEs.

The state management when a usage type reaches its maximum allotment depends on the usage type. When ME/LE allocations reach their maximum allotment, the allocation fails and further items are allocated from the process specific space on the host by the host. When unexpected header allocations reach their maximum allotment, the NIC pulls a free item from the head of the unexpected free queue that is referenced in the Process Control Block PCB. The PCB is indexed by a process identifier (PID) and provides per process information for use by the NIC. List root items can also be allocated from process specific ME space by the host. In contrast, when the rendezvous high water mark is reached, processing of new rendezvous messages are blocked until state is available.

When a NIC frees an ME, it either returns it to the process it came from or to the general free list 802. If the ME is a host side ME, it is returned to the process it came from which is known by the process context of the receive. If the ME is a NIC side ME, the process is checked for its usage level. If the usage level of the process is above the low water mark, the ME is returned to the general free list 802 and the process' in-use count 810 is decremented. If the usage level of the process is below the low water mark 816, the ME and other MEs (if available) are returned to the process.

When an unexpected header item is freed, it is pushed back onto the general NIC free list 806 if it is a NIC item and onto the head of the appropriate process specific list if it is a host based item. Rendezvous items are freed to the general free list on the NIC and list root items are freed similar to MEs, except that they are not returned to the ME.

When a process in the host initializes a Portals interface (PtlNIInit), it requests a set of match list entries (MEs) or list root entries (LEs) dependent on the type of network interface. The process requests low water mark MEs/LEs on an "all or nothing" basis. If the request is granted, a series of ME/LE return operations provides the indices of the MEs/LEs. If the request is denied due to resource exhaustion, a failure event is posted.

When a process initializes a Portal table entry (PtlPTAlloc), it obtains a list root entry using a command that allows the NIC 106 to fill a NIC side list root entry. A request is sent to the NIC 106, and an event returned on a dedicated event queue (for example, event queue handle 0) indicating success or failure. If failure, a host side ME structure is used for the list root entry. In either case, a list root pointer is stored in the Page Table Entry (PTE).

The host is the primary location for allocating an ME or LE to an application. When the host initiates an MEAppend (or LEAppend) operation, it allocates an ME and provides that ME handle to the NIC 106. If possible, that ME allocation is provided from NIC state.

The Portals host library maintains a small pool of unused MEs that it "owns" in NIC state. If that pool has an available ME, the MEAppend command takes one of the available MEs and removes it from the pool. If that pool is exhausted, the Portals library requests a plurality of MEs. In an embodiment, the NIC allocates 24 MEs to the processor or none. If allocated, the 24 MEs are returned to the application in a special event queue. If MEs are allocated to the host, the host uses one of those MEs. Otherwise, the host takes an ME from its pool of memory and uses that ME. The upper most bit of the 17 bit ME handle is set to 1 if the ME is on the host and 0 if it is on the NIC. When an MEAppend uses an NIC side ME, that ME is removed from the list for that process (it is always at the head of the list) and moved to the appropriate queue associated with a PTE. The count associated with the process is not decremented until the item is freed.

Due to the dynamic allocation of NIC state, there are numerous ways that unreasonable state allocation can occur. Foremost among these is for certain types of state to be completely starved or for other types of state to consume an undue portion of the NIC state. Another type of unfairness may be for a given process to obtain too large of a share of the NIC state. For this reason, various counters are maintained and various high and low water marks are honored.

An event queue facilitates the interaction of the host side and NIC side resources. The event queue is used to communicate information about the completion of a message from the network layer to the application. The NIC maintains high and low water mark variables to store pre-posted list state available to each process. The high water mark limits the fraction of the NIC state that can be dedicated to a process. The low water mark specifies the minimum amount of state that the NIC 106 provides each process. The amount of state used by each process associated with the NIC for pre-posted receives is tracked.

The NIC 106 also maintains a high water mark for both the pre-posted receive and unexpected message usage of NIC resources. Either of these types of state can consume all of the NIC resources. However, the NIC 106 tracks the total usage of each one on the NIC with an overall count to ensure that neither crosses the high water mark.

Figure 9:
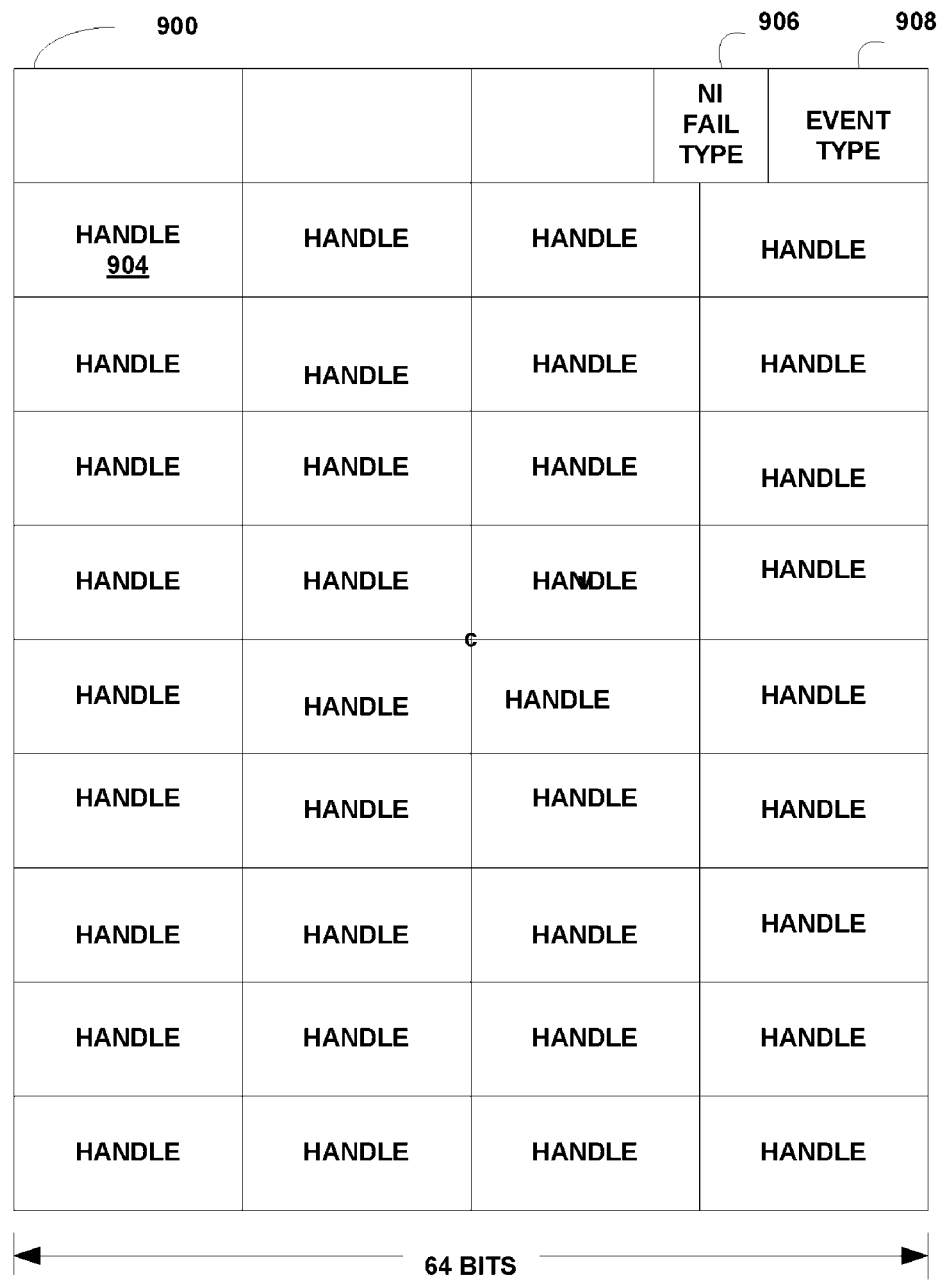
FIG. 9 illustrates an event format to return handles to the application using the list processing logic shown in FIG. 8.

FIG. 9 illustrates an event format to return handles to the application using the list processing logic in FIG. 8. The event has 64 bytes to store 30 16-bit handles 902, a 4-bit fail type 906 and a 5-bit event type 908

Each address is a handle 904, that is, an N+1 bit field, where the width of N is set by the larger of the total number of entries available on the NIC 106 or the number of entries per process on the host. The additional bit indicates whether the handle 904 refers to a NIC entry or a host entry. Handles 904 that reference NIC entries become absolute addresses into the NIC memory. For example, a 1 MB NIC memory can have 16K entries, using a 14 bit address for a hardware implementation or an offset into an array for a firmware implementation. Handles that reference host memory use a per process virtual base address and use the handle without the Most Significant Bit (MSB) bit as an index into that array.

A partitioned allocation scheme allows the host to employ host side spill-over resources when NIC based resources are not available. A dynamic state management scheme for NIC based resources prevent starvation of one resource type by spilling over to host memory before NIC resources are completely exhausted.

In high performance computing (HPC) networks, data (state) included in the header of messages constitutes a significant amount of overhead. In many cases, there is a tradeoff between storing additional state at the initiator (sender) of a message and storing data in the header of a message that is echoed back over the network 116 in an acknowledgement. An initiator is a process that starts a network transaction. A target is a process that is the target of a network transaction.

For end-to-end reliability, data is typically buffered until an acknowledgement is received. The buffering of the data requires significant state in the NIC 106. As storage on the NIC 106 is expensive, the choice is often made to send the additional state, for example, a few extra bytes per application level message over the network 116 instead of creating a data storage structure that is stored in the NIC 106. A software application initiates application level messages. These messages may be as small as one byte or larger than a million bytes. These application level messages can be subdivided into network packets prior to transmission over the communications network.

While it is possible to simply buffer commands for retransmission, many HPC messages are small and are sent using Programmed Input/Output (PIO). As PIO messages include data in addition to the command, this increases the storage required to store the messages in the NIC for end-to-end reliability over the network 116.

Typically, an acknowledgement is resolved back to the message that it is acknowledging using a sequence number and a source of the acknowledgement. As acknowledgements typically return in order, outstanding requests are typically stored in an ordered list that is searched when an acknowledgement is received. However, acknowledgements can be received out of order and because lists are typically managed with a hash table at the front end this implies that a search function is typically invoked. The search function can be computationally expensive.

In an embodiment of the present invention, the amount of state transferred over the network 116 is reduced by storing additional state and the data portion of the PIO command in the NIC 106 in the transmit end-to-end reliability logic 204 shown in FIG. 2. In addition, the search for an outstanding request is performed as a simple lookup using a retransmission buffer handle stored in a network message.

Figure 10:
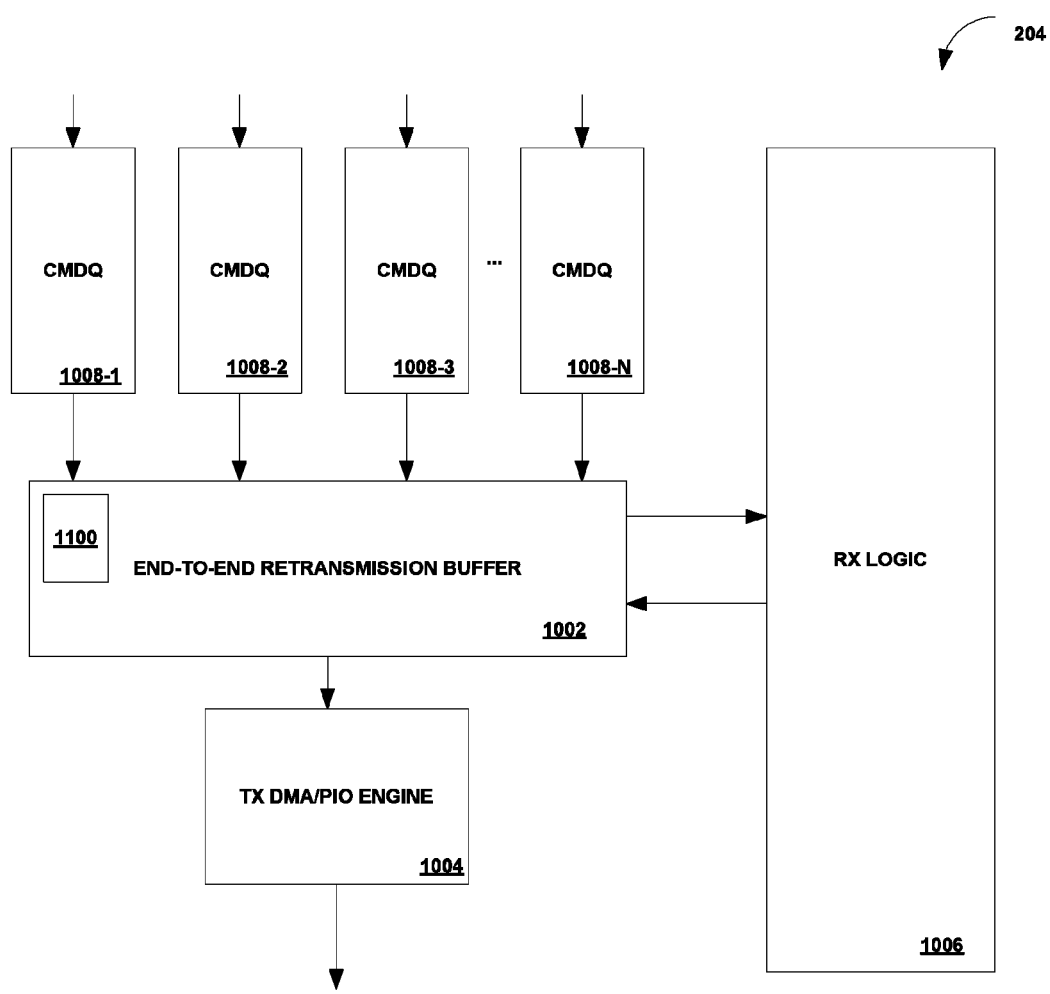
FIG. 10 illustrates an embodiment of the transmit end-to-end reliability logic shown in FIG. 2.

FIG. 10 illustrates an embodiment of the transmit end-to-end reliability logic 204 shown in FIG. 2. An end-to-end retransmission buffer 1002 is integrated with the transmit DMA/PIO engine 1004 to minimize network header state and retransmit buffer size.

In an embodiment, an end-to-end retransmission buffer 1002 is placed early in the header processing pipeline. Commands received via command queues 1008-1, . . . , 1008-N are buffered as they are received from an application or the operating system in the host system via the host bus 114. By placing the end-to-end retransmission buffer 1002 early in the header processing pipeline, it is possible to merge the retransmission buffer 1002 with the storage of protocol state. One handle (pointer) is used to reference both the end-to-end retransmission buffer 1002 and the protocol state. As discussed earlier, the protocol state is a few extra bytes per application message that is transmitted over the network.

In a traditional embodiment that uses the Portals Application Programming Interface (API) the User Pointer and Memory Descriptor (MD) handle are echoed across the network 116 to avoid having to create and manage a storage structure for the user pointer and the MD in the NIC 106. An MD is a descriptor of a memory region that is used by the initiator. When the end-to-end retransmission buffer 1002 is placed early in a header processing pipeline, the end-to-end retransmission buffer 1002 contains a copy of the User Pointer and the MD handle in the retransmission buffer 1100 that is stored in the NIC. By leveraging the fact that the end-to-end retransmission buffer 1100 holds a copy of the User Pointer and the MD handle, the state sent across the network 116 can be reduced.

Figure 11:
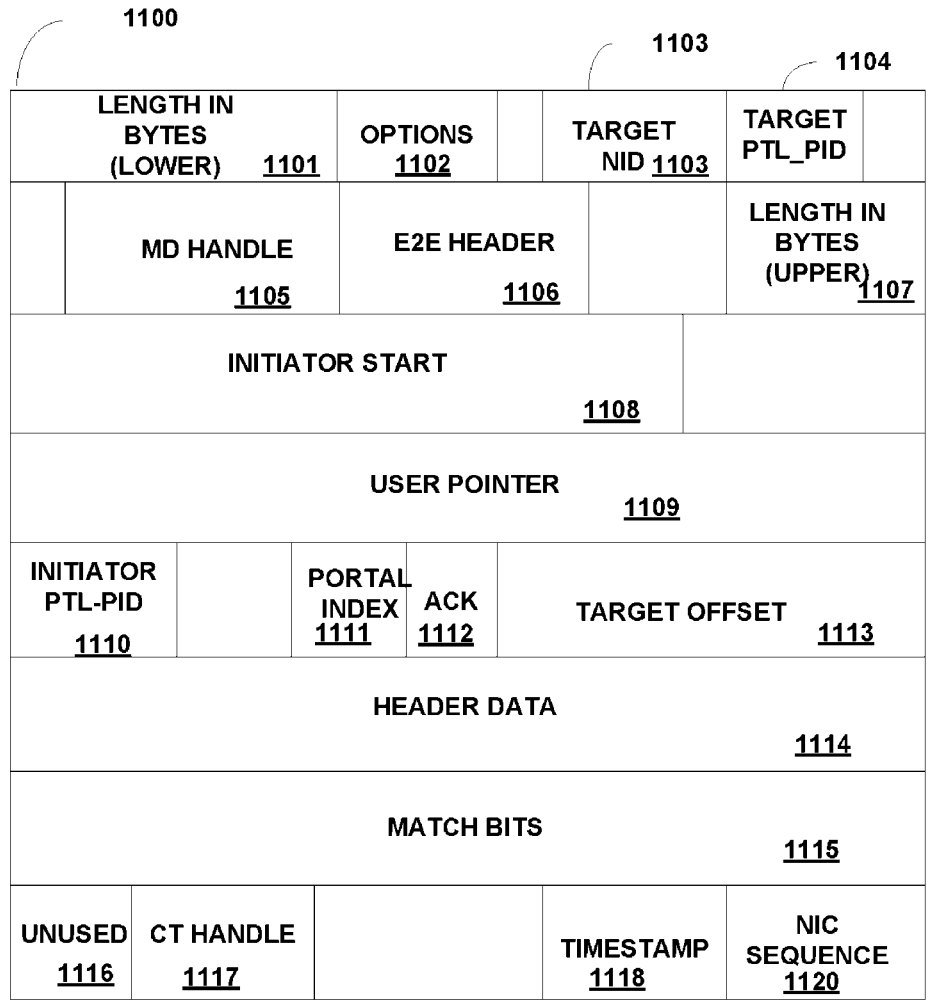
FIG. 11 is an embodiment of a structure of a retransmission buffer in the end-to-end retransmission buffer shown in FIG. 10.
Figure 12:
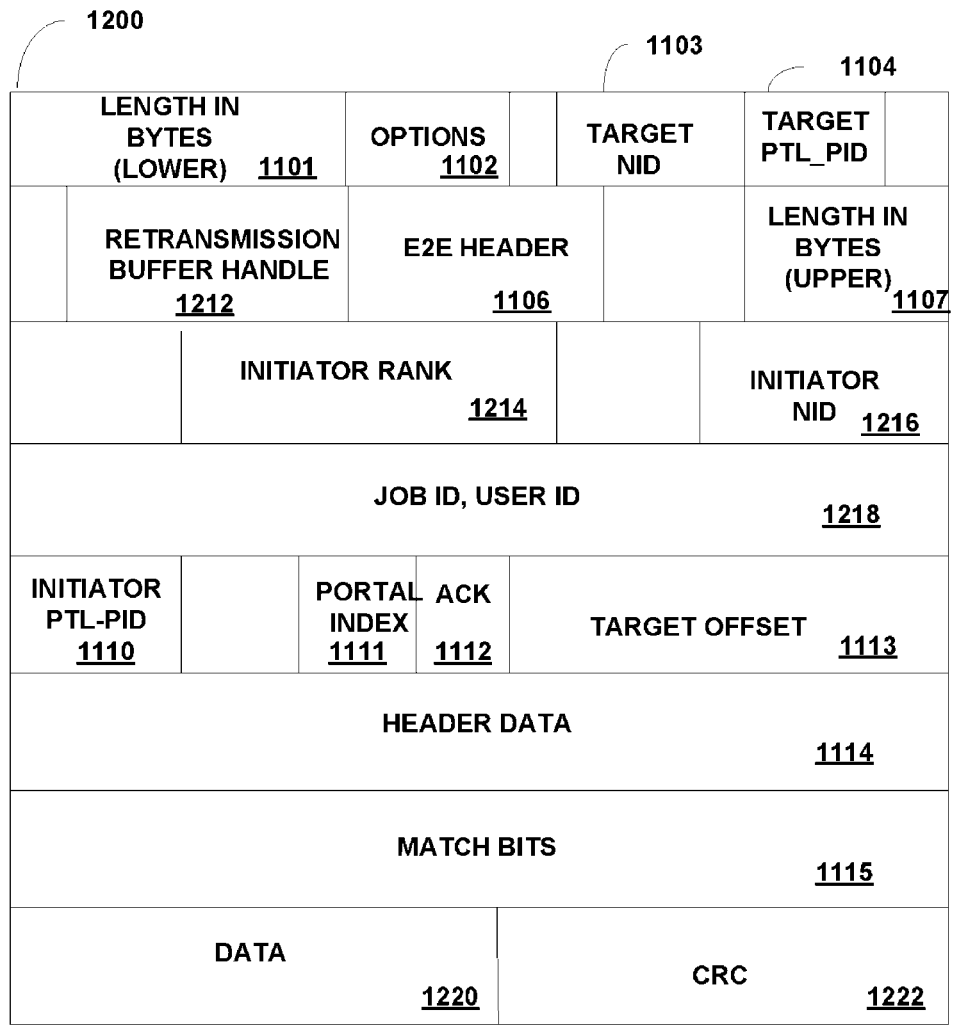
FIG. 12 is an embodiment of the structure of a header in a network message.

FIG. 11 is an embodiment of a structure of one of a plurality of retransmission buffers 1100 in the end-to-end retransmission buffer 1002 shown in FIG. 10. FIG. 12 is an embodiment of the structure of a header 1200 in an application level message transmitted over the network 116.

A state transformation between a retransmission buffer 1100 in the end-to-end retransmission buffer 1002 and the network message 1200 is illustrated in FIGS. 11 and 12. Some fields in the retransmission buffer 1100 in FIG. 11 are modified to provide the header 1200 of the network message shown in FIG. 11. The reuse of the retransmission buffer 1100 for the storage of the User Pointer and MD handle allows the replacement of ten bytes of data (the user pointer and Memory Descriptor (MD) handle) in the retransmission buffer 1100 with 2 bytes of data (the retransmission buffer handle) in the packet header that will go across the network 116. These fields are not used until an acknowledgement for the network message 1200 is received.

The typical management of a retransmission buffer 1100 uses the Target Node ID (NID) 1103 of the network message header 1200 and a sequence number to search the end-to-end retransmission buffer 1002 to find a network message header 1200 that is being acknowledged. This search is performed because a direct handle into the retransmission buffer 1100 in the end-to-end retransmission buffer 1002 is not provided in the network message header 1200. As the end-to-end retransmission buffer 1002 is unified with other state that the upper layer protocols needs, the same two bytes that reduce the total header space for an upper layer protocol can be used as a direct index into the end-to-end retransmission buffer 1002 to eliminate the search for the network message header 1200. For example, as shown, in FIG. 12, a retransmission buffer handle 1212 is stored in the network message header 1200

As shown in FIG. 11, the retransmission buffer 1100 includes the following fields: length in bytes 1101, options 1102, target NID 1103, Target PTL_PIDC 1104, Memory Descriptor Handle 1105, E2E header 1106, length in bytes (upper) 1107, initiator start 1108, user pointer 1109, initiator PTL-PIDC 1110, Portal Index 1111, ACK 1112, Target Offset 1113, Header Data 1114, Match bits 1115, CT handle 1117, timestamp 1118 and NIC sequence 1120.

The Target NID field 1103 stores the Node Identifier (ID) of the destination of the message. The Target PTL_PID field 1104 stores the process ID of the destination of the message. The Memory Descriptor (MD) handle field 1105 stores a descriptor of the memory region of the source of the message. The E2E header field 1106 stores the header used by the end-to-end reliability protocol which includes a sequence number. The length in bytes(upper) field 1107 stores the uppermost bits of the length of the message. The initiator start field 1108 stores the starting address of the data to transfer at the initiator of the message. The user pointer field 1109 is an arbitrary field to store a pointer provided by the user. The initiator PTL_PID field 1110 stores a source process ID. The Portal Index field 1111 stores a part of the Portals addressing scheme. The ACK field 1112 stores the type of ACK that this message requests. The Target offset field 1113 stores an offset from a base address at the target where this message will be placed. The Header Data field 1114 is an arbitrary field storing header data provided by the user. The Match bits field 1115 stores a value used by Portals to help resolve this message to a target buffer. The CT handle field 1117 stores a reference to a counter that is incremented when this message completes. The Timestamp field 1118 stores an indication as to when this message was sent. The NIC sequence field 1120 stores a local sequence number used for ordering.

As shown in FIG. 12, the network message header 1200 includes the same fields discussed in conjunction with the retransmission buffer 1100 shown in FIG. 11 with some exceptions. The MD handle field 1105 in the retransmission buffer 1100 is replaced by the retransmission buffer handle 1212 and the user pointer field 1109 in the retransmission buffer 1100 is replaced by the Job ID and User ID field 1218. In addition, the initiator ID start field 1108 in the retransmission buffer 1100 is replaced by an initiator rank field 1214. The initiator rank field 1214 stores the logical source of the message. An additional Initiator NIC field 1216 in the network message header 1200 stores an identifier that identifies one of two halves of the NIC from which the message was received. A data field 1220 stores data and a CRC field 1222 stores Cyclic Redundancy Check (CRC).

In addition, an end-to-end retransmit buffer 1002 that buffers commands, stores the entire command for Programmed Input/Output (PIO) messages. PIO messages may range up to 1 KB or greater in size. An initiator start address field corresponding to the initiator start field 1108 in the retransmission buffer 1100 is added to the programmed I/O command so that the programmed I/O command can be converted to a Direct Memory Access (DMA) command. This allows data to be retransmitted without having to store all of the data that may need to the retransmitted. Thus, the initial command uses programmed I/O for the lowest latency, but in the case of a retransmit, the command is modified to be a DMA command instead of storing all of the PIO data in the end-to-end retransmit buffer 1002. By storing only the 64 byte command instead of the entire PIO message (including data to be retransmitted), the amount of state stored in the end-to-end retransmit buffer 1002 is significantly reduced.

The retransmission buffer 1100 is moved closer to the command queues that initiate the message so that it can store commands to be retransmitted. This simplifies the lookup of acknowledged messages and allows key data items to be stored locally rather than being echoed across the network. At this point in the pipeline, it is also possible to store in the retransmission buffer 1100 only as much information about a PIO command as is needed to reissue it as a DMA command. This minimizes the storage requirements for the retransmission buffer 1100 and thus significantly reduces die area and power.

High performance computing (HPC) typically uses a Message Passing Interface (MPI) Application Programming Interface (API) for message passing. In reliable protocols, used by HPC systems, a "rank", that is, an MPI process within an MPI job can send a message to any other rank in the MPI job at any time. As MPI applications can be sensitive to message latency, the connections are maintained to all of the ranks, that is, the "peer" communicating processes in the job. In a lightweight messaging stack oriented to MPI, the per-rank connection state maintained may be limited to only the current transmit sequence number and the current receive sequence number used by the end-to-end reliability protocol.

The per-rank connection state can be maintained using full sequence number state or dynamic connections. In full sequence number state, the next sequence number to be transmitted for every connected node is stored in a table. This requires storing a significant and growing amount of state dependent on the number of nodes in the HPC system that rapidly becomes infeasible.

In dynamic connections, the sequence number is included in the connection context, and a connection context is only established when there is at least one message to be transmitted from the initiator to the target. This can impose high latency when a new message is sent because HPC programming models are fully connected. Thus, it is possible to send messages to all ranks on all nodes in rapid succession, for example, during a program-wide collective communication. Such a scenario, results in rapid, repeated connection establishment and tear down cycles that reduces the performance of the system by a significant factor.

As the number of nodes in a HPC system increase, the state (sequence number state) associated with these sequence numbers can grow beyond what is practical to implement. For example, with one-million-nodes in a system, several megabytes of sequence number state per node is needed to maintain the state of node-to-node communications. In addition, because some MPI implementations can track sequence numbers on a per-core basis, with multiple cores per node, there can be hundreds of megabytes of state dedicated to storing sequence numbers.

In an embodiment, a mechanism to reduce the amount of sequence number state stored is provided in the Transmit End-to End Reliability logic included in the end-to-end retransmission buffer 1002 shown in FIG. 10. In contrast to the dynamic connections described earlier which require a round-trip to establish the connections, sequence number state is only maintained for targets (destinations) with outstanding (pending) requests from the initiator (transmit side). In contrast to most implementations that track sequence numbers for all targets, this eliminates storage of most transmit side sequence number state.

A small change to the protocol and the movement of sequence number tracking from a separate state location into a structure that tracks outstanding requests results in a dramatic reduction in the total sequence number state stored by significantly reducing the state associated with transmit side sequence numbers. The amount of memory to store transmit side sequence number state (that is, the next sequence number to be transmitted) is reduced.

The state required to implement end-to-end reliability is reduced by limiting the transmit sequence number space to the currently in-flight messages. The next sequence number to be transmitted is only stored for communicating pairs (initiator, target) with an outstanding (pending) message, that is a message that is waiting for acknowledgment from the target. All "next sequence numbers" for other initiators are assumed to be zero. The reliability protocol is modified to allow the initiator (transmit side) to reset the expected received-message sequence number to zero.

Figure 13:
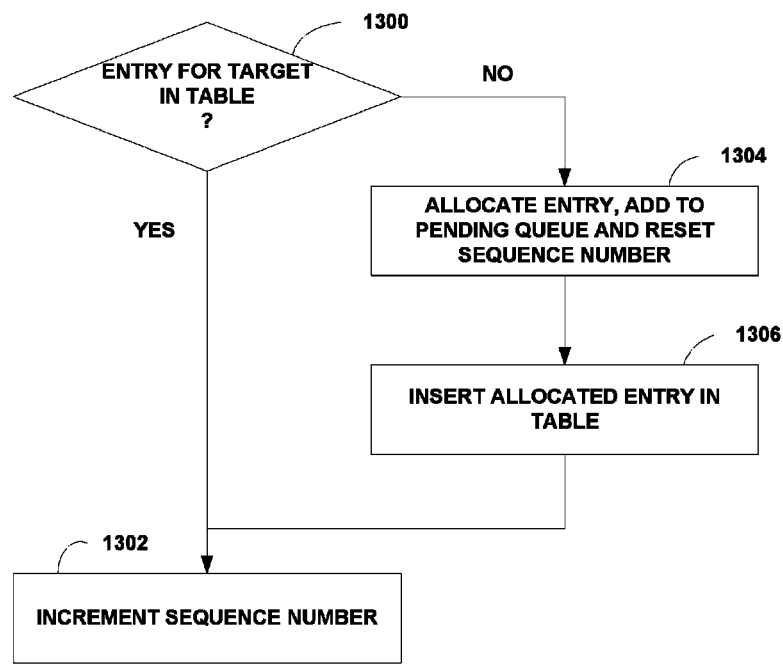
FIG. 13 is an embodiment of a method used by the transmit side in an initiator for handling a new message to be transmitted to a target.

FIG. 13 is an embodiment of a method used by the transmit side in an initiator for handling a new message to be transmitted to a target.

At block 1300, the initiator looks for a tracker entry that is associated with the destination address of the target. In many cases, the number of outstanding messages allowed is small; thus, outstanding messages can be tracked in a variety of ways at the initiator. Software structures such as hash tables can be used to facilitate discovering the oldest outstanding message to a target. In another embodiment, a Content Addressable Memory (CAM) that is indexed by the target node identifier is used to find the next sequence number to transmit. If there is an entry in the tracker table, processing continues with block 1302.

At block 1302, there is an outstanding request to the target waiting for an acknowledgment from the target, the sequence number in the entry that indicates the number of outstanding requests to the target is incremented. The initiator tracks all outstanding messages to each target and increments the sequence number in a tracker entry associated with the target with each new message sent to the target. Processing is complete.

At block 1304, there is no tracker entry associated with the destination address of the target in the table. This is a new message to be sent to a target without an already outstanding message. A tracker entry is allocated, the allocated tracker entry is added to a pending (outstanding requests) queue and the sequence number associated with the tracker entry is reset. Processing continues with block 1306.

At block 1306, the allocated tracker entry is added to a table of tracker entries. Processing continues with block 1302.

Figure 14:
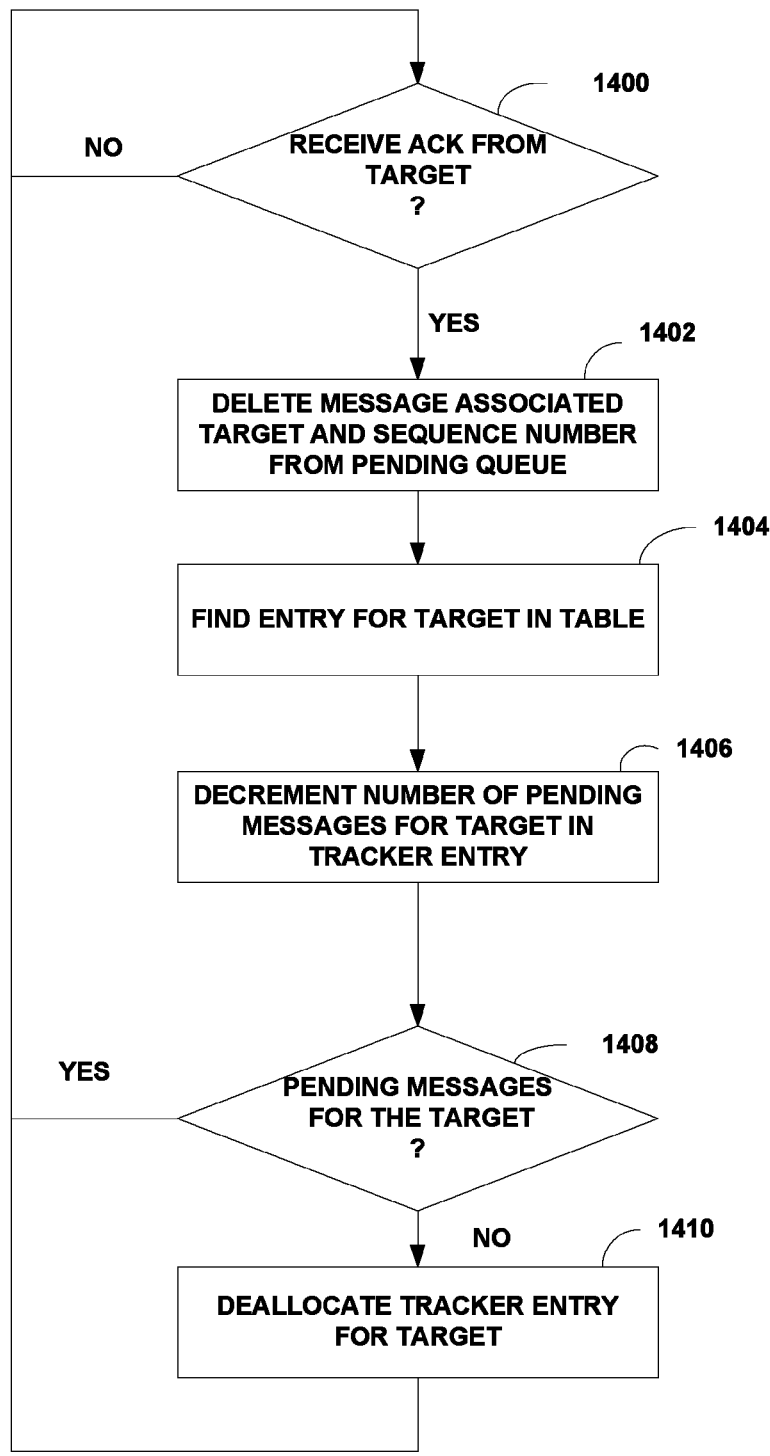
FIG. 14 is an embodiment of a method used by the transmit side in an initiator for handling a message acknowledgment from a target.

FIG. 14 is an embodiment of a method used by the transmit side in an initiator for handling a message acknowledgment from a target.

At block 1400, the initiator monitors receipt of an acknowledgment from the target. If an acknowledgment is received, processing continues with block 1402.

At block 1402, an acknowledgment is received from a target. The initiator removes the message associated with the target and sequence number from the pending queue. Processing continues with block 1404.

At block 1404, the initiator searches for the tracker entry associated with the target from which the message was received. Processing continues with block 1406.

At block 1406, the initiator decrements the number of outstanding messages associated with the target stored in the tracker entry for the target. Processing continues with block 1408.

At block 1408, the initiator checks if the number of pending messages associated with the target is set to a reserved value indicating that there are no messages to be transmitted. In an embodiment, the reserved value can be zero. If there are no messages to be transmitted, processing continues with block 1410. If there are messages to be transmitted, processing continues with block 1400.

At block 1410, there are no pending messages associated with the target. The tracker entry associated with the target is deallocated (deleted). Processing continues with block 1400.

Figure 15:
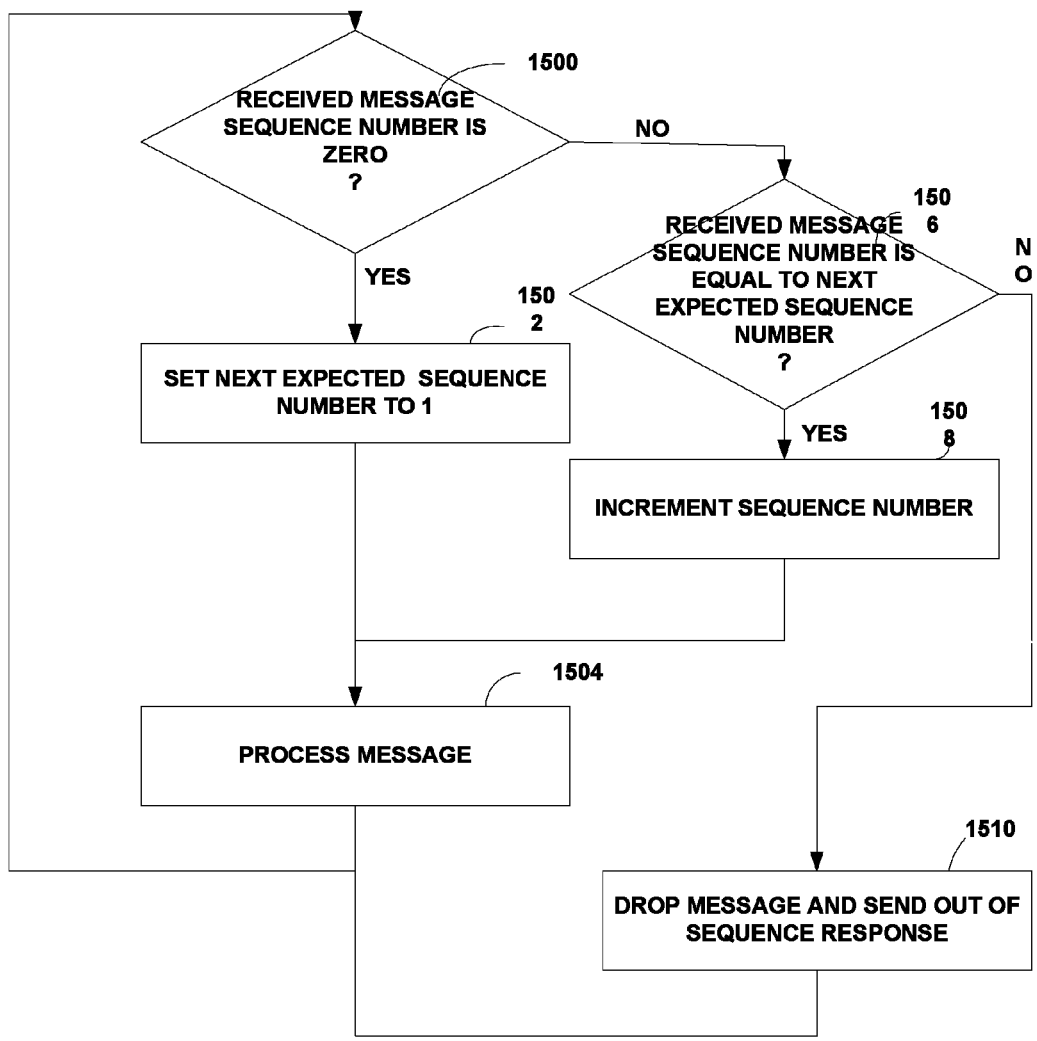
FIG. 15 is an embodiment of a method used by the receive side in a target for handling a new message received from an initiator.

FIG. 15 is an embodiment of a method used by the receive side in a target for handling a new message received from an initiator.

At block 1500, the receive side in the target checks the sequence number in the received message. If the sequence number is equal to zero, processing continues with block 1502. If not, processing continues with block 1506.

At block 1502, the expected next sequence number is set to '1'. When a new message is sent to a target (receive side) without an already outstanding message, this message is flagged as resetting the sequence number to zero. Processing continues with block 1504.

At block 1504, the received message is processed by the receive side in the target. Processing continues with block 1500 to handle the next received message from the initiator.

At block 1506, the receive side in the target checks if the sequence number in the received message is the expected next sequence number stored by the target. The target (receiver) tracks the next expected sequence number, because it cannot anticipate when a sequence number will be reset. If the sequence number is the expected sequence number, processing continues with block 1508. If not, processing continues with block 1510.

At block 1508, the receive side in the target increments the next expected sequence number. Processing continues with block 1504 to process the received message.

At block 1510, the sequence number in the received message did not match the expected sequence number. The message is dropped and an out of sequence response is returned to the initiator. The expected sequence number is discarded when all acknowledgements from a target are received. Processing continues with block 1500 to wait for a next received message.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. A non-transitory computer-readable storage medium having stored thereon instructions which, when executed by one or more processing units, cause the one or more processing units to perform a method at a first network node, the method comprising:
receiving a request from an initiator to transmit a first message from the first network node to a second network node;
based on the request, adding to a table of the first network node a first entry associated with the second network node, wherein, for each entry of the table, the entry is associated with a respective network node for which one or more messages are pending, wherein for each pending message, the message has been sent from the first network node and a corresponding acknowledgement message has yet to be received by the first network node;
maintaining at the first entry a first value indicating a total number of pending messages associated with the second network node; and
removing the entry in response to determining that a total number of pending messages associated with the second network node is equal to zero.

2. The computer-readable storage medium of claim 1, wherein adding the first entry to the table is based on a determination, in response to the request, that any entry of the table is associated with a respective destination address other than a destination address of the second network node.

3. The computer-readable storage medium of claim 1, wherein the first value is a sequence number corresponding to a message to be sent to the second network node.

4. The computer-readable storage medium of claim 3, the method further comprising resetting the sequence number and incrementing the sequence number.

5. The computer-readable storage medium of claim 1, the method further comprising:
detecting an acknowledgment message received at the first network node from the second network node; and
in response to detecting the acknowledgment message, removing from a queue of pending messages a message associated with the second network node.

6. The computer-readable storage medium of claim 5, the method further comprising updating the first value in the first entry in response to detecting the acknowledgment message.

7. A non-transitory computer-readable storage medium having stored thereon instructions which, when executed by one or more processing units, cause the one or more processing units to perform a method at a first network node, the method comprising:
detecting a first message received at the first node from a second network node;
in response to detecting the first message, determining whether any message received by the first network node from the second network node is currently pending, wherein, for each pending message received by the first network node from the second network node, the message has been received from the second network node and a corresponding acknowledgement message has yet to be sent to the second network node;
where the determining indicates that a total number of pending messages received by the first network node from the second network node is equal to zero, setting a sequence number to indicate that the total number of pending messages is equal to one;
where the determining indicates that one or more messages received by the first network node from the second network node are pending:
determining whether a sequence number associated with the first message is equal to a corresponding expected next sequence number;
where the sequence number equals the corresponding expected next sequence number, incrementing the expected sequence number; and
where the sequence number does not equal the expected sequence number:
dropping the first message; and
sending to the second network node an out-of-sequence response message.

8. The computer-readable storage medium of claim 7, wherein the second network node tracks pending messages sent from the second network node to the first network node.

9. An apparatus comprising:
circuitry configured to receive a request from an initiator to transmit a first message from the apparatus via a network to a second apparatus, the apparatus to couple to the second apparatus via a network;
circuitry configured to add to a table of the apparatus, based on the request, a first entry associated with the second apparatus, wherein, for each entry of the table, the entry is associated with a respective network node for which one or more messages are pending, wherein for each pending message, the message has been sent from the apparatus and a corresponding acknowledgement message has yet to be received by the apparatus;
circuitry configured to maintain at the first entry a first value indicating a total number of pending messages associated with the second apparatus; and
circuitry configured to remove the entry in response to determining that a total number of pending messages associated with the second apparatus is equal to zero.

10. The apparatus of claim 9, wherein the circuitry configured to add the first entry to the table is to make a determination, in response to the request, that any entry of the table is associated with a respective destination address other than a destination address of the second apparatus.

11. The apparatus of claim 9, wherein the first value is a sequence number corresponding to a message to be sent to the second apparatus.

12. The apparatus of claim 11, further comprising circuitry configured to reset the sequence number and increment the sequence number.

13. The apparatus of claim 9, further comprising circuitry configured to:
detect an acknowledgment message received at the apparatus from the second apparatus; and
in response to detection of the acknowledgment message, remove from a queue of pending messages a message associated with the second apparatus.

14. The apparatus of claim 13, further comprising circuitry configured to update the first value in the first entry in response to detection of the acknowledgment message.

15. An apparatus comprising:
detecting a first message received at the first node from a second apparatus, the apparatus to couple to the second apparatus via a network;
in response to detecting the first message, determining whether any message received by the apparatus from the second apparatus is currently pending, wherein, for each pending message received by the apparatus from the second apparatus, the message has been received from the second apparatus and a corresponding acknowledgement message has yet to be sent to the second apparatus;
where the determining indicates that a total number of pending messages received by the apparatus from the second apparatus is equal to zero, setting a sequence number to indicate that the total number of pending messages is equal to one;
where the determining indicates that one or more messages received by the apparatus from the second apparatus are pending:
determining whether a sequence number associated with the first message is equal to a corresponding expected next sequence number;
where the sequence number equals the corresponding expected next sequence number, incrementing the expected sequence number; and
where the sequence number does not equal the expected sequence number:
dropping the first message; and
sending to the second apparatus an out-of-sequence response message.

16. The apparatus of claim 15, wherein the second apparatus tracks pending messages sent from the second apparatus to the apparatus.

* * * * *